US005605345A

United States Patent [19]

Erfurth et al.

[11] Patent Number: 5,605,345

[45] Date of Patent: Feb. 25, 1997

[54] WHEELED APPARATUS FOR USE AS WALKER AND WHEELCHAIR

[75] Inventors: Ronald L. Erfurth, Oregon, Wis.; Lloyd L. Lautzenhiser, Nobel, Canada; Wendell E. Miller, Warsaw, Ind.

[73] Assignee: Brookefield Hunter Incorporated, Oregon, Wis.

[21] Appl. No.: 140,779

[22] Filed: Oct. 21, 1993

[51] Int. Cl.[6] .......... B62M 1/14

[52] U.S. Cl. .......... 280/250.1; 280/304.1; 280/650; 280/87.21; 280/47.39; 135/67; 297/5

[58] Field of Search .......... 280/250.1, 304.1, 280/661, 647, 648, 650, 47.36, 47.371, 47.38, 47.39, 47.4, 47.41, 79.2, 87.21, 87.41, 87.05, 87.51, 42, 30; 135/67; D12/130, 131; 180/330; 296/65.1; 297/5, 6, 13, 118, 378.1; 482/66

[56] References Cited

U.S. PATENT DOCUMENTS

| | | | |
|---|---|---|---|
| D. 277,561 | 2/1985 | Erfurth | D12/130 |
| D. 283,884 | 5/1986 | Erfurth | D12/130 |
| D. 293,663 | 1/1988 | Erfurth | D12/130 |
| D. 295,155 | 4/1988 | Erfurth | D12/130 |
| 1,576,075 | 3/1926 | Tisdell | 280/42 |
| 3,529,700 | 9/1970 | Marshall | 188/2 |
| 3,997,180 | 12/1976 | Okubo | 280/47.41 |
| 4,081,051 | 3/1978 | Logsdon | 290/65.1 |
| 4,371,183 | 2/1983 | Dion | 280/650 |
| 4,384,732 | 5/1983 | Wierwille | 188/2 |
| 4,493,488 | 1/1985 | Panaia | 280/650 |
| 4,643,211 | 2/1987 | Morris et al. | 135/67 |
| 4,748,994 | 6/1988 | Schultz et al. | 482/66 |
| 4,759,562 | 7/1988 | Vinyard et al. | 280/87.21 |
| 4,863,181 | 9/1989 | Howle | 280/250.1 |
| 4,907,839 | 3/1990 | Rose et al. | 297/6 |
| 5,060,967 | 10/1991 | Hulterstrum | 280/47.4 |
| 5,131,672 | 7/1992 | Robertson et al. | 280/250.1 |

FOREIGN PATENT DOCUMENTS

| | | | |
|---|---|---|---|
| 2731952 | 1/1978 | Germany | 280/250.1 |
| 8909158 | 10/1989 | WIPO | 280/250.1 |

*Primary Examiner*—Anne Marie Boehler
*Attorney, Agent, or Firm*—Wendell E. Miller

[57] ABSTRACT

Wheeled apparatus (10) is usable both as a wheeled walker and as a wheelchair. The wheeled apparatus (10) includes a foldable frame (12 or 258), first (16A) and second (16B) transversely spaced-apart wheels that are attached to the frame (12 or 258) with a negative camber angle, a third wheel (24A) that is longitudinally spaced from the first (16A) and a second (16B) wheels and that is attached to the frame (12 or 258), and a seat cushion (97) that is attached to the frame (12 or 258). When used as a wheeled walker, bi-directional seat (101, 124, 146, or 162) provides rearward facing seating (186) for resting, and when used as a wheelchair, the bi-directional seating means (101, 124, 146, or 162) provides forward facing seating (187). Centers (94) of handgrips (82A and 82B) are disposed longitudinally intermediate of the first and second wheels (16A and 16B) and the third wheel (24A) to minimize danger of the wheeled apparatus (10) tipping backwardly when used as a wheeled walker. A negative camber angle of the first and second wheels (16A and 16B) minimizes danger of the wheeled apparatus (10) tipping sideways, and an asymmetrical folding mechanism (15 or 256) reduces or removes the negative camber angle when the foldable frame (12 or 258) is folded, thereby minimizing the required size of a shipping container.

53 Claims, 12 Drawing Sheets

FIGURE 8
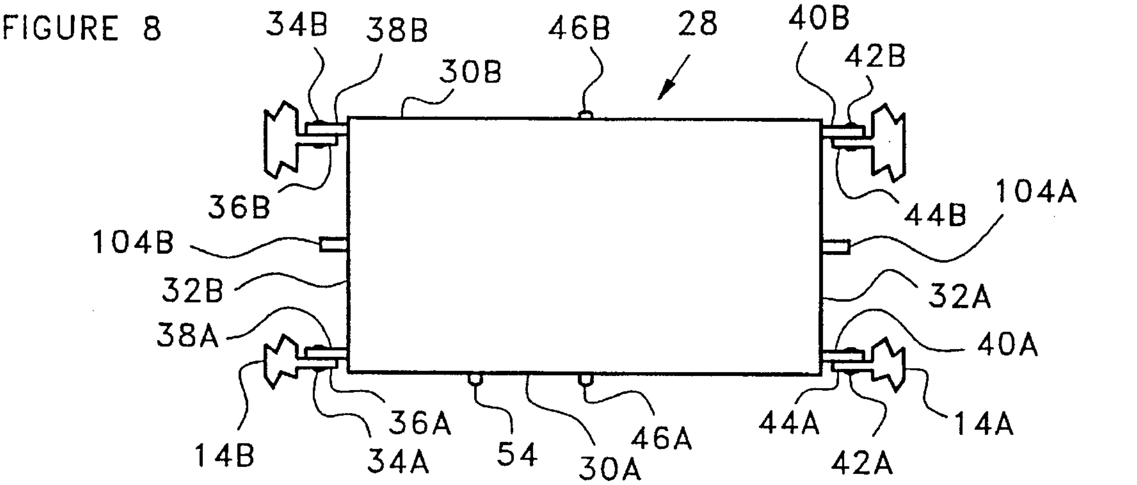
FIGURE 21
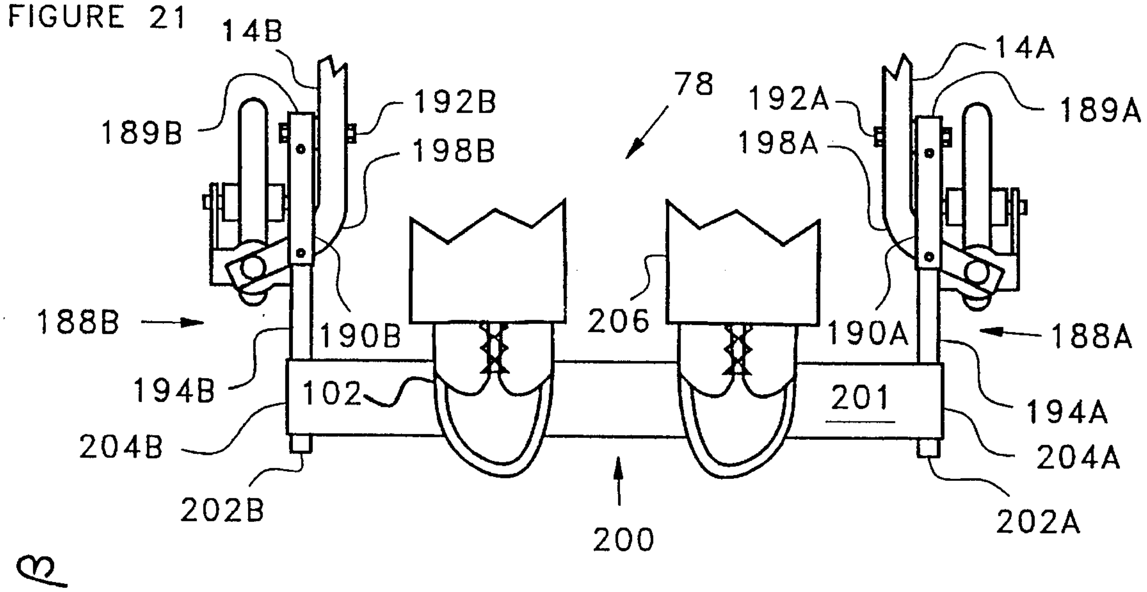
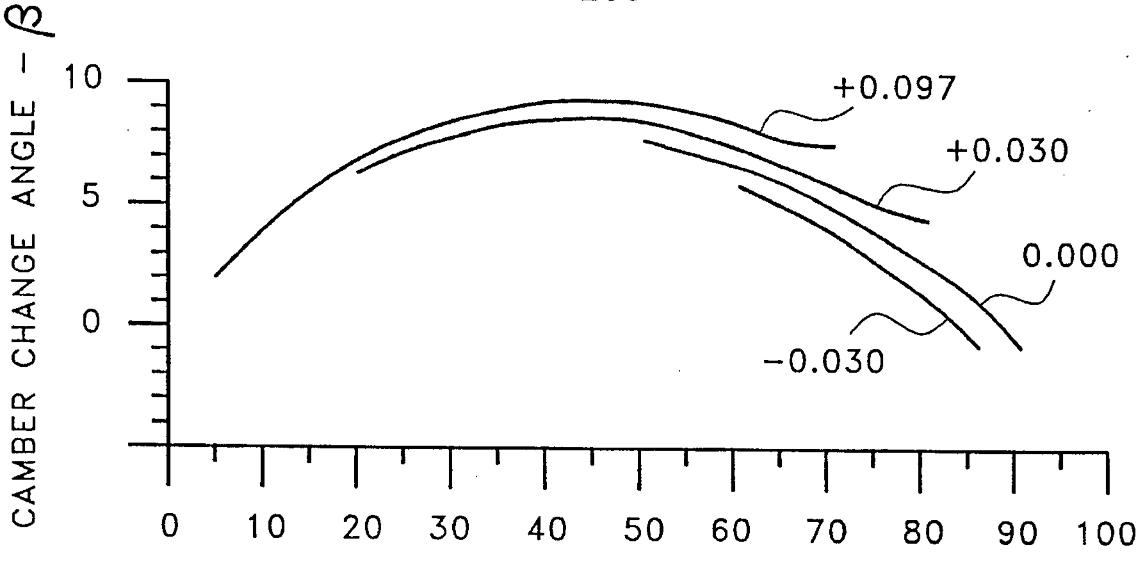
FIGURE 23

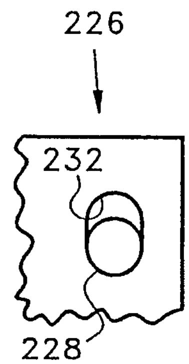
FIGURE 26
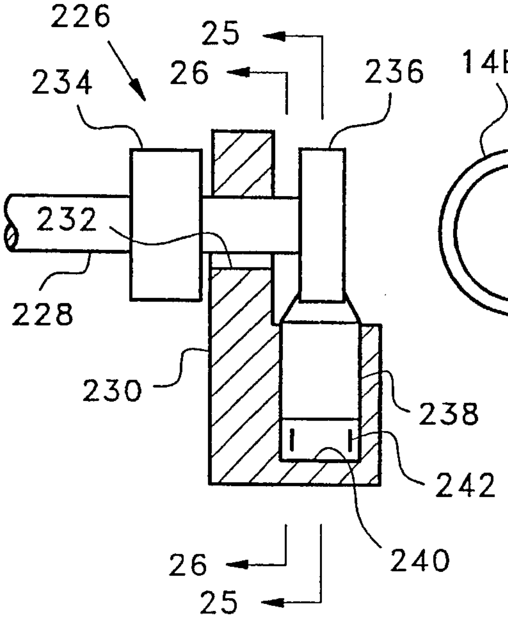
FIGURE 24
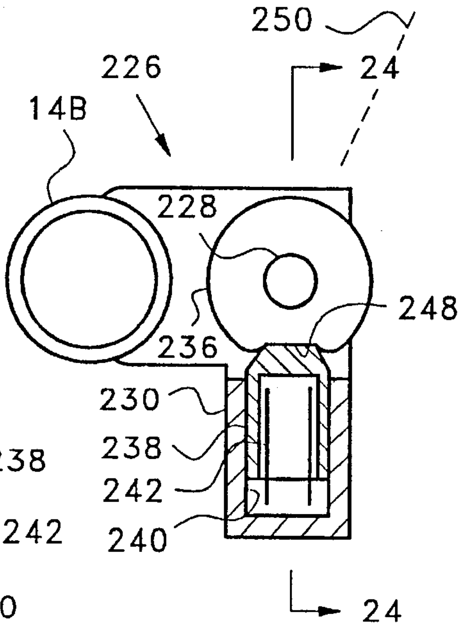
FIGURE 25
FIGURE 30
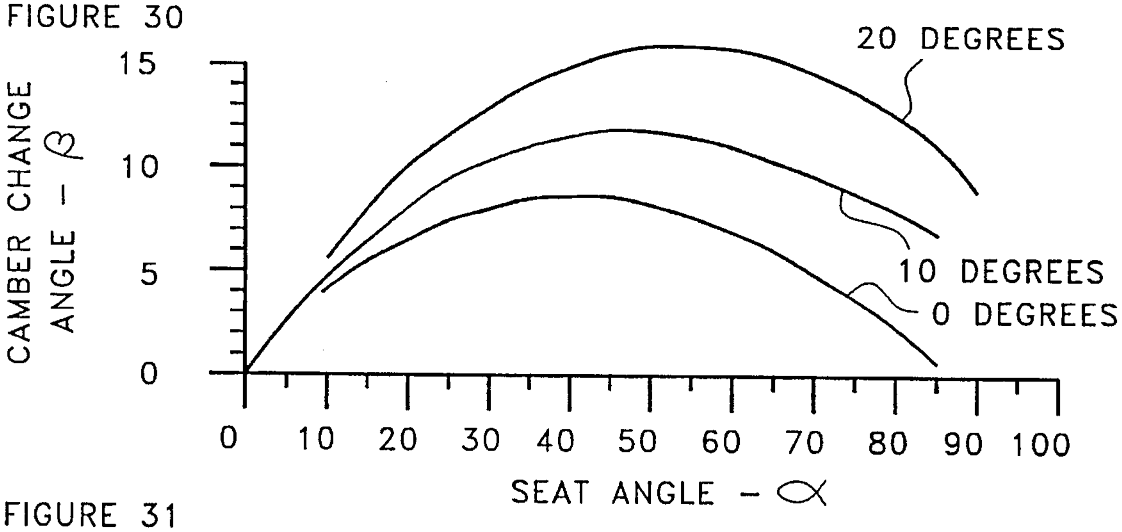
FIGURE 31
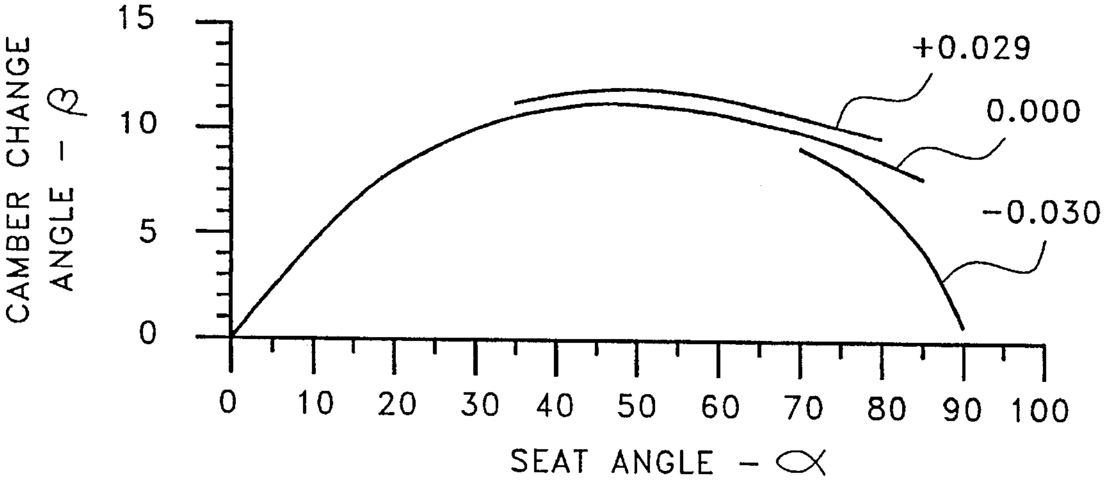

WHEELED APPARATUS FOR USE AS WALKER AND WHEELCHAIR

BACKGROUND OF THE INVENTION

The present invention pertains generally to wheeled apparatus. More particularly, the present invention pertains to wheeled apparatus having a foldable frame, and having various uses such as a wheeled walker, a wheelchair, and both a wheeled walker and a wheelchair.

FIELD OF THE INVENTION

A vast number of individuals, whether by reason of infirmity or age, either temporarily or permanently, are unable to walk at all, are unable to walk without assistance, are unable to walk safely without a walker, or lack the physical endurance to walk any significant distance.

In the past, wheelchairs, canes, and crutches were the only aids for this large group of people. Wheelchairs have made mobility possible for those unable to walk, for those unable to walk without danger of falling, and for those unable to walk for significant distances.

Canes and crutches, and more recently multifooted canes and walkers having handles and a plurality of legs, have assisted those who are able to walk, but are not able to walk safely without some aid to stability.

DESCRIPTION OF THE RELATED ART

A significant advance for those needing aid to stability has been the wheeled walker. Wheeled walkers include three or four wheels, one or two of the wheels being castored, and either a push bar or a pair of handgrips. Hand actuated brakes have made wheeled walkers safe to use, and wheeled walkers have alleviated the laborious actions of picking up a walker, placing it a step ahead, and then taking a step. Also, some wheeled walkers have included a seat, so that a person lacking vitality can walk safely until tired, and then sit and rest on the wheeled walker.

Thus, the wheeled walker, especially when equipped with a seat, has allowed those, either without vitality or without stability in walking, to obtain the physical exercise that is so necessary for adequate oxygen intake, good metabolism, and minimal bone loss.

However, even though wheeled walkers with a seat have been a boon to handicapped individuals, they have not been optimum vehicles for the handicapped. That is, wheeled walkers have not provided an alternate means for propelling, and/or they have not provided seating facilities that should accompany an alternate means for propelling.

More particularly, for the seat of a wheeled walker to be the safest, most convenient, and most useful, it should be usable without the necessity of a user walking from the rear to the front of the wheeled walker to sit down. That is, the seats of wheeled walkers should face rearwardly with respect to the normal direction of travel.

However, if means is added for self-propelling the wheeled walker, so that it can be used as a wheelchair, then either the direction of travel should be reversed, or a seat should be provided that faces in the opposite direction.

Means for self-propelling should include handrims on the large wheels, and optionally, the means for self-propelling may include a battery and motors drivingly connected to respective ones of the large wheels.

Further, in situations where a handicapped individual is accompanied by another person, and the handicapped person becomes tired of walking, provision should be made for the handicapped person to be pushed in the wheeled walker as if he were in a wheelchair. For this use of a wheeled walker, it is obvious that the handicapped person will want to sit facing forwardly.

Therefore, for use as a wheeled walker, the seat should face rearwardly, and for use as a wheelchair, the seat should face forwardly. This need must be met by either providing two seats, one facing either way, or by providing a seat in which an occupant can face in either of the two directions.

For a seat to be usable facing either direction, the first and most important requirement is that no structural member interfere with the occupant's legs. However, more preferably, a seating assembly should be provided in which a back thereof is optionally positionable with respect to a seat cushion thereof, thereby providing a seat back that is usable whether an occupant is facing forwardly or backwardly.

In addition to the seating requirement for a wheeled apparatus that is usable as both a wheeled walker and a wheelchair, such an apparatus must have load sustaining stability when a downward force is placed on the handgrips of the push handles.

Even though a wheelchair commonly includes handgrips for manual propulsion of the wheelchair by a person walking behind it, the handgrips of a wheelchair are located so far rearwardly that the wheelchair will tip backwardly if too much downward pressure is placed onto the handgrips when the wheelchair is being used as a wheeled walker.

That is, a wheelchair will work as a walker, as long as the person using it does not need the supportive safety that is provided by a wheeled walker. Therefore, wheeled apparatus that is useful as both a wheeled walker and a wheelchair should have the handgrips disposed longitudinally intermediate of the front wheels and the rear wheels.

Obviously, when used either as a wheelchair or as a wheeled walker, wheeled apparatus should have good stability. However, when used as a wheelchair, the center of the load is lower, being centered below the top of the larger wheels. In contrast, when a wheeled apparatus is used as a wheeled walker, the load is applied much higher—at the handgrip area. Therefore, stability is more critical for wheeled apparatus used as a wheeled walker than for similar apparatus used as a wheelchair.

One way to improve stability is to increase the distance between the wheels. Another way is to negatively camber the wheels—to dispose the wheels so that they are farther apart at their bottom portions than at their top portions. This increases the effective width and the resultant stability without actually increasing the width of the wheeled apparatus.

A large percentage of wheeled walkers and wheelchairs are built with foldable frames. This allows the wheeled walker or wheelchair to be folded and then transported in the trunk of an automobile. Foldable frames also facilitate shipment from the factory or distributor in an assembled condition while still maintaining the maximum carton size allowed for package shipment.

Applying negative camber to the design of wheeled walkers or wheelchairs increases the folded thickness of the wheeled apparatus. While this increase in thickness may or may not be significant, depending upon the size of a particular automobile trunk, additional thickness may preclude shipment of wheeled apparatus in a single carton with wheels assembled to the frame.

Therefore, an optimized design of a wheeled apparatus of the types discussed herein should include negative camber, but the design should also include means for decreasing the negative camber when the wheeled apparatus is folded. Preferably, this means for reducing camber should be means for automatically reducing the camber as a function of folding the frame.

The present invention achieves all of the foregoing design objectives of wheeled apparatus that can be used both as a wheeled walker and a wheelchair. Namely: wheeled apparatus in which no structural element interferes with use of the seat while sitting facing either forwardly or backwardly; wheeled apparatus in which a seat back is positionable for using the seat facing either forwardly or backwardly; handgrips that are disposed longitudinally intermediate of the large and small wheels so that the handgrips may be used as an aid for walking without danger of the wheeled apparatus tipping backwardly; wheels that have negative camber; means for reducing the negative camber; and automatic reduction of the camber when the frame is folded.

SUMMARY OF THE INVENTION

In the present invention, first and second transversely spaced-apart wheels are attached to a foldable frame. Third and fourth wheels, which are smaller in diameter than the first and second wheels, are disposed longitudinally from respective ones of the first and second wheels, are transversely spaced apart from each other, and are castored to the frame. That is, the small wheels are disposed toward a front of the wheeled apparatus, and the larger wheels are disposed toward a rear of the wheeled apparatus.

The larger wheels have negative camber. That is, the bottoms of the wheels are disposed transversely outwardly from the tops thereof, thereby providing greater resistance to overturning sidewardly, especially when a downward force is applied to one of the handgrips, such as when used as a wheeled walker.

Folding of the foldable frame moves the frame members, and the wheels attached thereto, inwardly toward a longitudinal axis of the wheeled apparatus. To reduce the folded package even more, the foldable frame is designed to remove a substantial part of the negative camber of the larger wheels when the frame is folded, thereby further reducing the folded size of the wheeled apparatus.

An asymmetrical linkage of the foldable frame achieves this reduction in negative camber of the wheels when the wheeled apparatus is folded. Preferably, the asymmetrical linkage is built to dimensions wherein the sum of a first pair of lengths is greater than the sum a second pair of lengths. Alternately, the two sums are equal, or the first sum of the first pair of lengths is smaller than the sum of the second pair.

In the preferred embodiment, a long strut includes three holes in a straight line. However, in an alternative embodiment, the long strut is bent around the intermediate of the three holes. In this bent strut embodiment, as in the straight strut embodiment, the sum of the first pair of lengths may be greater, equal to, or less than the sum of the second pair of lengths.

A seat cushion is attached to the frame longitudinally intermediate of the larger and smaller wheels, and a seat back is attached to the frame, being positioned for use by an occupant sitting in the seat and facing forwardly. Means, which may include handrims on the larger wheels, or which may include a battery and two motors drivingly attached to the larger wheels, is provided for self-propelling the wheeled apparatus without the necessity of the occupant having his feet on the floor. As described thus far, the wheeled apparatus may be used as a wheelchair.

A push handle, which includes a handgrip, is attached to the frame, and the handgrip is disposed longitudinally intermediate of the large and small wheels. Thus, the handgrip provides means for pushing the wheeled apparatus. Further, since the handgrip is disposed longitudinally intermediate of the large and small wheels, the wheeled apparatus may be used as a wheeled walker without danger of the wheeled apparatus tipping backwardly if the user should start to fall.

The seat includes a seat cushion and a seat back. The wheeled apparatus is designed to avoid placing any structural member in the way of using the seat facing either forwardly when the wheeled apparatus is used as a wheelchair, or rearwardly when the wheeled apparatus is used as a wheeled walker and the use thereof wants to sit and rest. Further, means is provided for selectively positioning the seat back for use facing forwardly or backwardly.

The handgrips are attached to a telescoping handle, a lower part of which is attached to the foldable frame, and an upper part of which is attached to the handgrips. When the telescoping handle is extended, the handgrips provide means for propelling the wheeled apparatus, whether used as a wheelchair or as a wheeled walker. However, when the telescoping handle is shortened and the handgrips are rotated by 180 degrees, the handgrips are usable as armrests by a person using the wheeled apparatus as a wheelchair.

In a first aspect of the present invention, wheeled apparatus is provided which comprises a frame having a longitudinal axis, first and second transversely, spaced-apart wheels being operatively attached to the frame, a third wheel being longitudinally spaced from the first and second wheels and being operatively attached to the frame, and a seat cushion and a seat back being operatively attached to the frame, the improvement which is characterized by the frame being foldable between open and folded positions; means, including a push handle, for using the apparatus as either a wheelchair or a wheeled walker; and bi-directional seating means for selectively positioning the seat back toward the push handle when the apparatus is used as a wheelchair, and away from the push handle when the wheeled apparatus is used as a wheeled walker.

In a second aspect of the present invention, wheeled apparatus is provided which comprises a frame having a longitudinal axis, first and second transversely spaced-apart wheels being operatively attached to the frame, a third wheel being longitudinally spaced from the first and second wheels and being operatively attached to the frame, and a seat cushion and a seat back being operatively attached to the frame, the improvement which is characterized by means, including a push handle, for using the apparatus as either a wheelchair or a wheeled walker; bi-directional seating means for selectively positioning the seat back toward the push handle when the apparatus is used as a wheelchair, and away from the push handle when the wheeled apparatus is used as a wheeled walker; the seat back includes first and second surfaces; the means for selectively positioning the seat back toward and away from the push handle comprises means for selectively using different ones of the surfaces as a backrest; and the bi-directional seating means further comprises means for folding the seat back down toward the seat cushion.

In a third aspect of the present invention, wheeled apparatus is provided which comprises a frame having a longitudinal axis, first and second transversely spaced-apart wheels being operatively attached to the frame, a third wheel being longitudinally spaced from the first and second wheels and being operatively attached to the frame, and a seat cushion and a seat back being operatively attached to the frame, the improvement which is characterized by means, including a push handle, for using the apparatus as either a wheelchair or a wheeled walker; bi-directional seating means for selectively positioning the seat back toward the push handle when the apparatus is used as a wheelchair, and away from the push handle when the wheeled apparatus is used as a wheeled walker; the operative attachment of the seat back to the frame including a seat-attaching bracket having a lower end operatively attached to the frame, and having an upper end operatively attached to the seat back; and the means for selectively positioning the seat back toward and away from the push handle comprises means for rotationally positioning the seat back around the operative attachment of the upper end of the seat-attaching bracket to the seat back.

In a fourth aspect of the present invention, wheeled apparatus is provided which comprises a foldable frame, a seat cushion being operatively attached to the frame, first and second transversely spaced-apart wheels being operatively attached to the frame, the frame having an opened position wherein the first and second wheels are spaced a maximum distance apart, and having a folded position wherein the first and second wheels are moved toward each other, the improvement which is characterized by bi-directional seating means, including the seat cushion, for sitting on the seat cushion facing either toward a front or toward a rear of the wheeled apparatus; a seat back being operatively attached to the frame; and means for selectively positioning the seat back for sitting while facing either toward the front or toward the rear of the wheeled apparatus.

In a fifth aspect of the present invention, wheeled apparatus is provided which comprises a foldable frame and first and second transversely spaced-apart wheels being operatively attached to the frame, the frame having an opened position wherein the first and second wheels are spaced a maximum distance apart, and having a folded position wherein the first and second wheels are moved toward each other, the improvement which is characterized by the operative attachment of the first and second wheels to the foldable frame including first and second axles that are operatively attached to the frame, and the first and second wheels being rotatably assembled to respective ones of the axles; means, including the axles being disposed at an angle to each other when the frame is in the open position, for cambering the wheels at a negative camber angle; and means for reducing the negative camber angle by at least 50 percent when the foldable frame is in the folded position.

In a sixth aspect of the present invention, a seat assembly is provided which comprises a seat frame, a seat cushion having a front and a back and being operatively attached to the seat frame, and a seat back with an upper end that is pivotally attached to the seat back with a lower end that is pivotally attached to the seat frame; means, including both of the pivotal attachments, for selectively positioning the seat back proximal to either the front or the back of the seat cushion; means, including one of the pivotal attachments, for permitting the seat back to be folded down toward the seat cushion; and means for preventing the seat back from pivoting backwardly while permitting the folding of the seat back down toward the seat cushion.

In a seventh aspect of the present invention, a method is provided for reducing the required size of a shipping package for wheeled apparatus having a foldable frame with side frame members, having a pair of wheels that are operatively attached to the foldable frame and that are disposed at a negative angle when the frame is in an open position, and having a seat frame that is pivotally attached to one of the side frame members, which method comprises reducing a required width of a shipping package by folding the foldable frame to a folded position; further reducing the required width by automatically reducing the negative camber angle when the foldable frame is folded; and reducing a required height of the shipping package by disposing the seat frame at an angle between horizontal and vertical when the foldable frame is folded, whereby the height of the shipping package is reduced.

BRIEF DESCRIPTION OF THE DRAWINGS

FIG. 8 is a partial top elevation of the wheeled apparatus of FIGS. 1–4, taken substantially as shown by view line 8—8 of FIG. 3, and showing the seat frame and attachment thereof to the left and right frame members of the foldable frame;

FIG. 21 is a partial end view, taken substantially the same as FIG. 20, showing a foot or leg supporting web that replaces the footrests and that extends between the footrest-attaching arms;

FIG. 23 is a graph showing curves of camber change angle per wheel vs. seat angle of the asymmetrical folding mechanism of FIGS. 5–7 when the asymmetrical folding mechanism is built according to four different sets of dimensions provided herein;

FIG. 24 is a cross section of a resilient mechanism, taken substantially the same as FIG. 1, and also taken substantially as shown by section line 24—24 of FIG. 25, that optionally is used to limit the camber change angle and/or to increase the angle to which the seat may be raised;

FIG. 25 is a cross section of the resilient mechanism of FIG. 24, taken substantially the same as FIG. 3, and also taken substantially as shown by section line 25—25 of FIG. 24;

FIG. 26 is a partial elevation of the resilient mechanism of FIGS. 24 and 25, taken substantially as shown by view line 26—26 of FIG. 24;

FIG. 30 is a graph of camber change angle per wheel vs. seat angle of the asymmetrical folding mechanism of FIGS. 5–7 when the asymmetrical folding mechanism is built according to the bent strut principle described herein, with one curve of the asymmetrical linkage without any bend, and one curve each of two different bend angles; and FIG. 31 is a graph of camber change angle per wheel vs. seat angle of the asymmetrical folding mechanism of FIGS. 5–7 when the asymmetrical folding mechanism is built according to the bent strut principle described herein, showing differences in camber change angle that result when the angle of the bent strut is kept constant and other dimensions of the asymmetrical linkage are changed.

DESCRIPTION OF THE PREFERRED EMBODIMENTS

Figure 1:
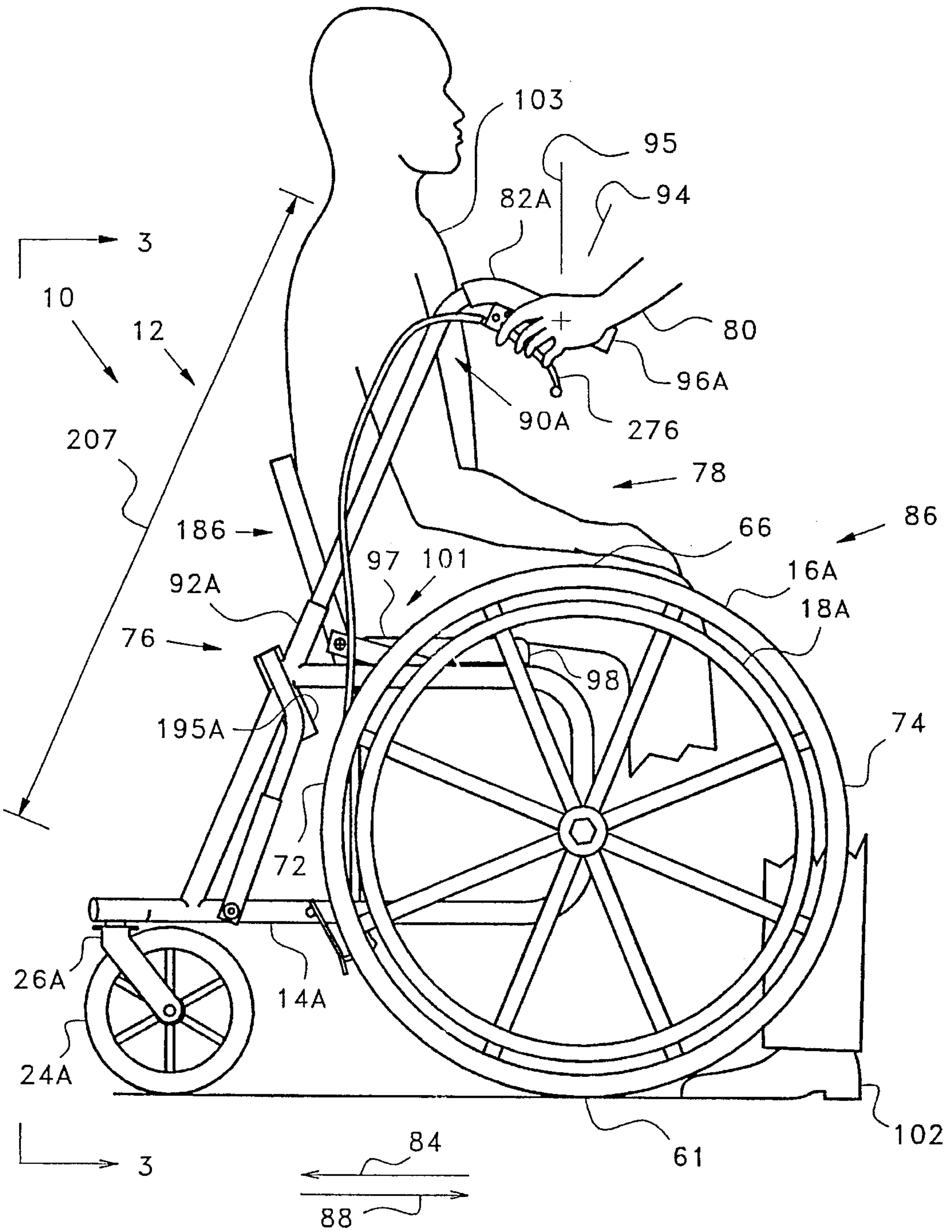
FIG. 1 is a side elevation of the wheeled apparatus of the present invention with the seat back positioned for sitting backwardly, showing the hands and feet of a person using the wheeled apparatus as a wheeled walker, and showing the head and torso of the same person sitting while facing backwardly and resting after using the wheeled apparatus as a wheeled walker.
Figure 2:
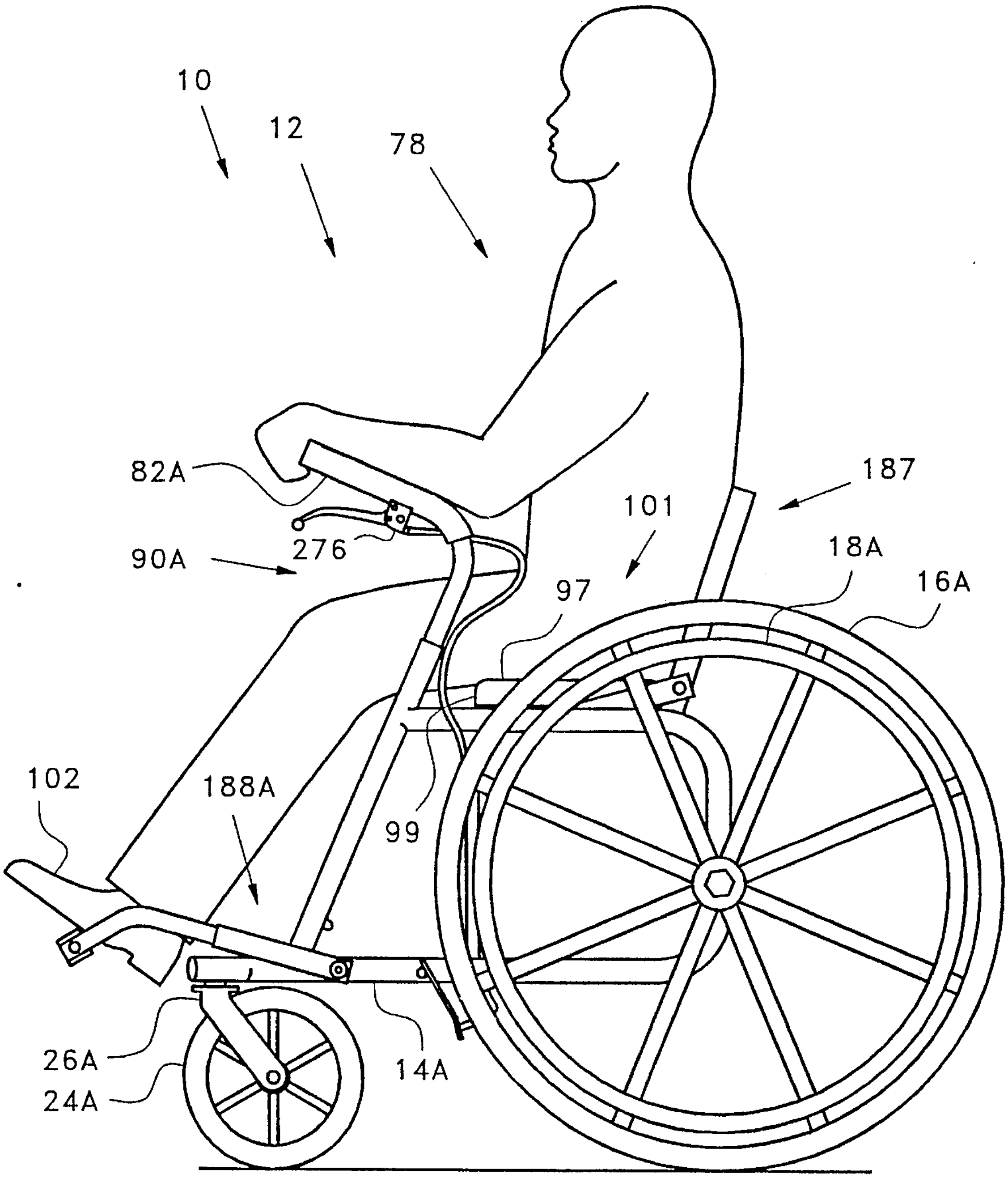
FIG. 2 is a side elevation of the wheeled apparatus of FIG. 1, taken substantially the same as FIG. 1, showing the seat back positioned for sitting while facing forwardly, showing the apparatus being used as a wheelchair, and showing the handgrips of FIG. 1 rotated and lowered for use a armrests.
Figure 3:
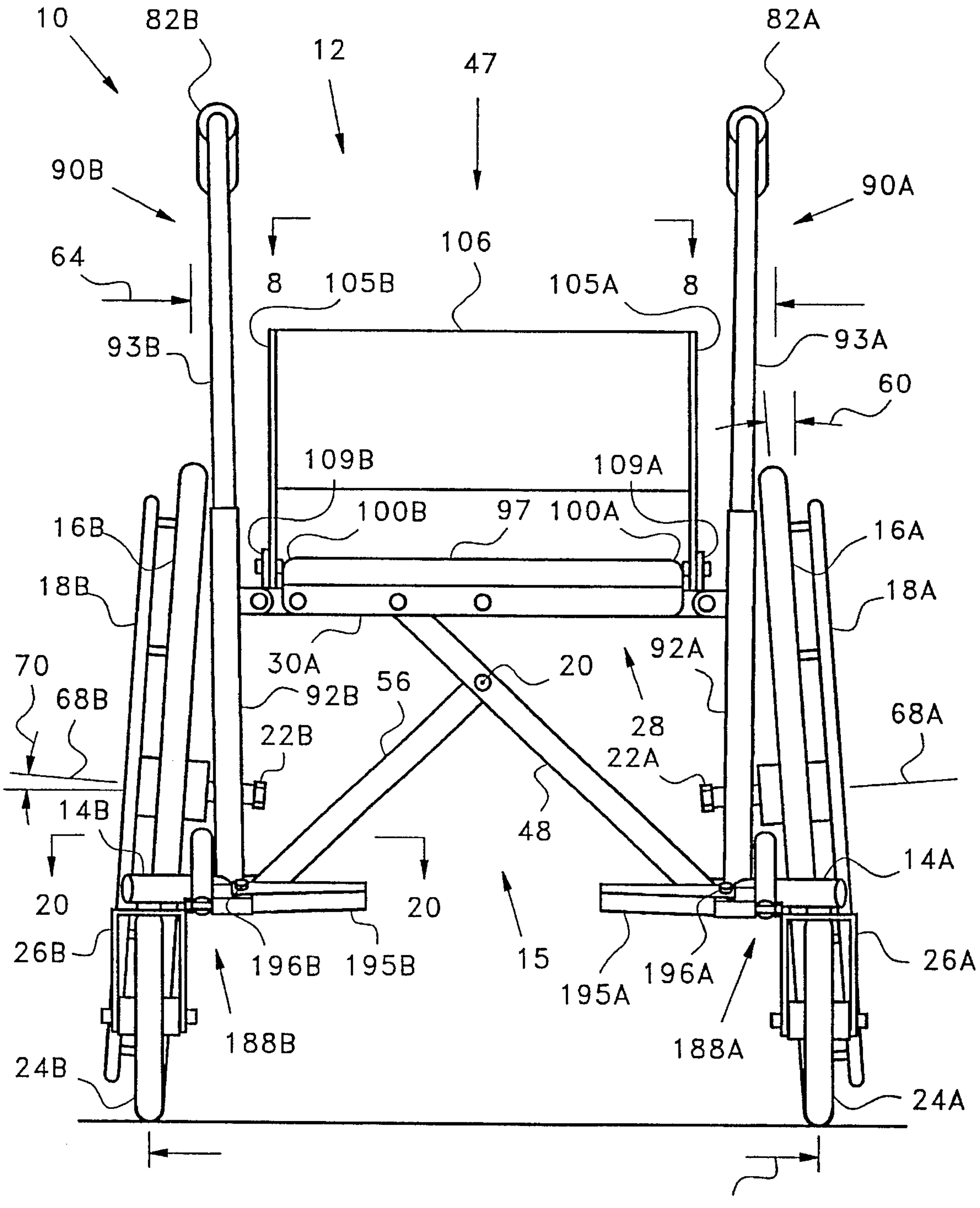
FIG. 3 is a front elevation of the wheeled apparatus of FIGS. 1 and 2, taken substantially as shown by view line 3—3 of FIG. 1, showing the negative camber angle of the larger wheels, with the handgrips positioned as shown in FIG. 1 for pushing the wheeled apparatus, and with the seat positioned for facing forwardly, illustrating the use of the wheeled apparatus as a wheelchair that can be pushed by another person.

Referring now to FIGS. 1—3, wheeled apparatus 10 includes a foldable frame 12 having a left side frame member 14A and a right side frame member 14B that are interconnected by an asymmetrical linkage, or asymmetrical folding mechanism, 15; a first larger wheel 16A and a second larger wheel 16B, each having a handrim 18A or 18B attached thereto, being transversely spaced apart with respect to a longitudinal axis 20 of the foldable frame 12, and being attached to the foldable frame 12 by respective ones of first and second axles, 22A and 22B; and third and fourth smaller wheels, or castored wheels, 24A and 24B, being transversely spaced apart with respect to the longitudinal axis 20 of the foldable frame 12, being longitudinally spaced from the respective ones of the larger wheels 16A and 16B, and being castored to the respective ones of the left and right side frame members, 14A and 14B, by yokes 26A and 26B.

Figure 5:
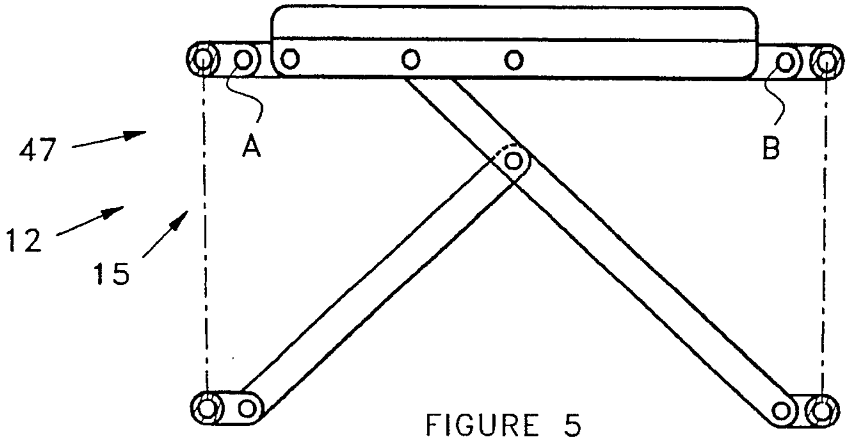
FIG. 5 is a partial and enlarged front elevation of the foldable frame of the wheeled apparatus of FIGS. 1–4, taken substantially the same as FIGS. 3 and 4, and showing the frame in an open position, as is also shown in FIG. 3.
Figure 6:
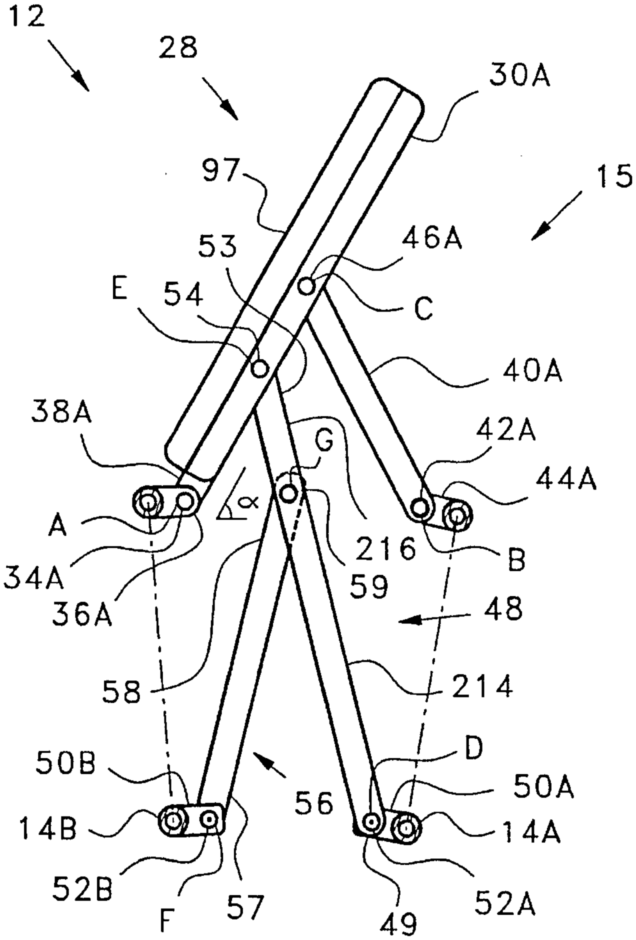
FIG. 6 is a partial and enlarged front elevation of the foldable frame of the wheeled apparatus of FIGS. 1–4, taken substantially the same as FIGS. 3 and 4, but showing the foldable frame in a partially folded position.
Figure 7:
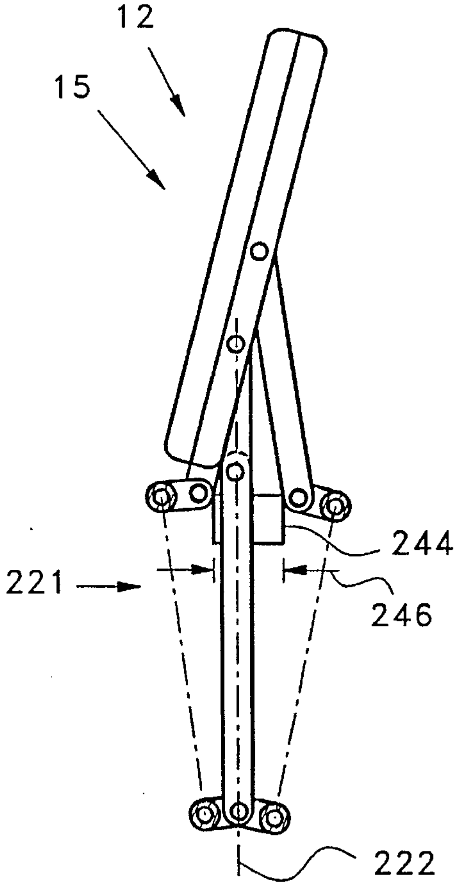
FIG. 7 is a partial and enlarged front elevation of the foldable frame of the wheeled apparatus of FIGS. 1–4, taken substantially the same as FIGS. 3 and 4, but showing the foldable frame in a completely folded position.

Referring now to FIGS. 5–7, the linkage 15 that interconnects the side frame members, 14A and 14B, is shown in an open position thereof in FIG. 5, in a partially folded position in FIG. 6, and in a folded position, or completely folded position in FIG. 7.

The asymmetrical linkage 15 of the foldable frame 12 includes portions of the side frame members, 14A and 14B, that will be named and numbered subsequently, portions of a rectangularly-shaped seat frame 28, and other parts that will be named and numbered subsequently.

Referring now to FIG. 8, the rectangularly-shaped seat frame 28 includes a front transverse member, or top link, 30A and a rear transverse member 30B, and ends 32A and 32B. The seat frame 28 is pivotally attached to the right side frame member 14B by a pivot pin 34A that engages a top front lug 36A of the right side frame member 14B and that also engages a front-attaching lug 38A of the seat frame 28.

Additionally, the seat frame 28 is pivotally attached to the right side frame member 14B by a pivot pin 34B that engages a top rear lug 36B of the right side frame member 14B and that also engages a rear-attaching lug 38B of the seat frame 28.

A top front link, or seat-supporting link, 40A is pivotally attached to the left side frame member 14A by a pivot pin 42A that engages a top front lug 44A of the left side frame member 14A, and the top front link 40A is pivotally attached to the front transverse member 30A of the seat frame 28 by a pivot pin 46A. In like manner, a top rear link 40B is pivotally attached to the left side frame member 14A by a pivot pin 42B that engages a top rear lug 44B of the left side frame member 14A, and the top rear link 40B is pivotally attached to the rear transverse member 30B of the seat frame 28 by a pivot pin 46B.

Referring now to FIGS. 3, 5, and 8, when the foldable frame 12 is in an open position 47, the seat frame 28 is supported by engaging the top front link 40A and the top rear link 40B.

Referring now to FIG. 6, a longer strut 48 has one end 49 that is pivotally attached to a lower lug 50A of the left side frame member 14A by a pivot pin 52A, and the longer strut 48 has another end 53 that is pivotally attached to the front transverse member 30A of the seat frame 28 by a pivot pin 54 at a location that is disposed intermediate of the pins 34A and 46A.

A shorter strut 56 has one end 57 that is pivotally attached to a lower lug 50B of the right side frame member 14B by a pivot pin 52B, and the shorter strut 56 has another end 58 that is pivotally attached to the longer strut 48 by a pivot pin 59 that engages the longer strut 48 intermediate of the pins 52A and 54.

Referring to FIGS. 1, 3, and 5, when the foldable frame 12 is in its opened position 47, as shown, the frame members 14A and 14B are disposed vertically. However, as also shown in FIG. 3, when the foldable frame 12 is in its open position 47, the larger wheels 16A and 16B have a wheel camber angle 60 that is negative. That is, bottoms 61 of the larger wheels 16A and 16B are disposed apart by a distance 62 which is greater than a distance 64 between the larger wheels 16A and 16B at tops 66 thereof.

This negative wheel camber angle 60 is achieved by disposing axes 68A and 68B of respective axles 22A and 22B at an axle camber angle 70 from horizontal. Preferably, the angle 70 is 4.0 degrees. Although not shown in the drawings, preferably the larger wheels 16A and 16B also have negative castor 71. That is, referring to FIG. 1, the larger wheels 16A and 16B toe out and are farther apart at fronts 72 thereof than at backs 74 thereof. Preferably, each of the larger wheels 16A and 16B toes out approximately one-half degree.

As shown in FIGS. 1 and 3, the wheeled apparatus 10 can be used as a wheeled walker with a front 76 of the wheeled apparatus 10 being in front of a user, or person, or occupant, 78 whose hands 80 are grasping handgrips 82A and 82B and with a forward direction 84 being the direction in which the user 78 is facing. In like manner, a rear 86 of the wheeled apparatus 10 is behind the user 78, as the user 78 is standing in FIG. 1, and a rearward direction 88 is opposite to the forward direction 84.

Figure 4:
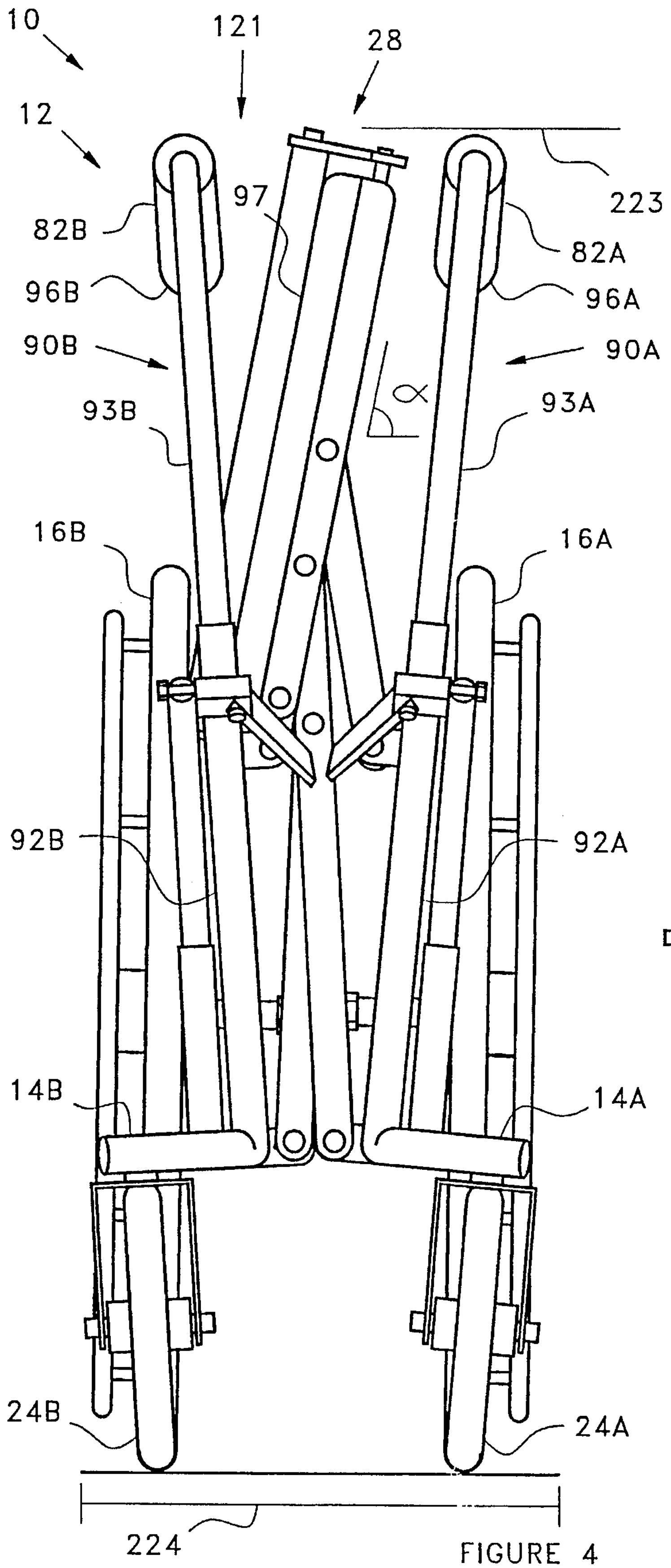
FIG. 4 is a front elevation of the wheeled apparatus of FIGS. 1–3, taken substantially the same as FIG. 3, but with the frame folded for carrying, showing the negative camber angle greatly reduced when the frame is folded, and showing the seat back folded down toward the seat cushion to allow the frame to be folded without removing the seat back.

Referring to FIGS. 1, 3, and 4, the wheeled apparatus 10 includes left and right telescopically adjustable push handles, 90A and 90B, each having a lower part 92A or 92B that is attached to one of the frame members 14A or 14B, and each having an upper part 93A or 93B that slides inside a respective one of the lower parts 92A or 92B. As shown in FIG. 1, the lower parts 92A and 92B are an integral part of the frame members 14A and 14B, thereby providing the aforesaid attachment of the lower parts 92A and 92B to the frame members 14A and 14B.

The handgrips 82A and 82B are attached to respective ones of the upper parts 93A and 93B of the push handles 90A and 90B. The lower parts 92A and 92B are positioned with respect to the frame members 14A and 14B so as to locate centers 94 of the handgrips 82A and 82B forward of the axles 20A and 20B of the larger wheels 16A and 16B.

That is, the centers 94 of the handgrips 82A and 82B are disposed at a predetermined longitudinal location, or longitudinal disposition, 95 which is longitudinally intermediate of the larger wheels 16A and 16B and the castored wheels 24A and 24B. Because of this location 95 of the centers 94 of the handgrips 82A and 82B, downward force located on the centers 94 of the handgrips 82A and 82B cannot tip the wheeled apparatus 10 backwardly.

For purposes of specificity in locating the centers 94 of the handgrips 82A and 82B, they are hereby defined as being located 2.5 inches from ends 96A and 96B of the handgrips 82A and 82B.

Referring now to FIGS. 1 and 3, not only is stability, and resultant safety enhanced by the location 95 of the centers 94 of the handgrips 82A and 82B, but also the negative wheel camber angle 60 of the larger wheels 16A and 16B effectively increases the distance 62 between the bottoms 61 of the larger wheels 16A and 16B, thereby increasing resistance to tipping sidewardly. This increased stability, while advantageous for a wheelchair, is even more important for a wheeled walker for two reasons. One is that the load applied to the handgrips 82A and 82B is higher from the ground than the center of gravity of the occupant 78 of a wheelchair. The other reason is that a person 78 who stumbles or falls may place a load on one of the handgrips 82A or 82B that includes a sideward component as well as a downward component.

A seat cushion 97, having a front 98 as shown in FIG. 1, a back 99 as shown in FIG. 2, and a left side 100A and a right side 100B as shown in FIG. 3, is attached to the seat frame 28 by any suitable means, not an inventive part of the present invention. As used herein, the word, "seat cushion" defines that part of a seat which supports the weight of the body, whether or not the "seat cushion" includes any padding, and whether or not the "seat cushion" is anything more than a surface of the seat frame 28.

By inspection of FIGS. 1–4, it can be seen that no structure interferes with sitting on the seat cushion 97 facing either toward the forward direction 84 or toward the rearward direction 88. Therefore, the seat cushion 97, together with the structure as shown and described, provides a bi-directional seating means or seat 101. Subsequently, a preferred embodiment of a selectively positional seat back 106, that includes a left side 105A and a right side 105B, will be shown and described as an optional part of the bi-directional seating means 101.

Referring now to FIG. 1, the person 78 who is using the wheeled apparatus 10 as a wheeled walker, and who is walking in the forward direction 84 as shown by the hands 80 and feet 102, can sit and rest on the seat cushion 97 facing in the rearward direction 88, as shown by a head and torso 103. That is, a place to sit and rest is provided that precludes the necessity of walking from the rear 86 to the front 76 of the wheeled apparatus 10.

Referring now to FIGS. 2 and 3, the wheeled apparatus 10 of FIGS. 1–3 includes means for propelling the wheeled apparatus 10 without the feet 102 of the person 78 touching the ground. Preferably, this means for propelling includes the handrims 18A and 18B that are attached to respective ones of the larger wheels 16A and 16B.

Referring now to FIGS. 1–3, since the wheeled apparatus 10 includes the push handles 90A and 90B for pushing the wheeled apparatus 10, the handrims 18A and 18B for self propulsion, and means 101 for sitting on the seat cushion 97 facing either forwardly or rearwardly, the wheeled apparatus 10 can be used as a wheeled walker, as shown in FIG. 1, and also as a wheelchair, as shown in FIG. 1.

Continuing to refer to FIGS. 1–3, when the wheeled apparatus 10 is used as a wheeled walker, as shown in FIG. 1, the handgrips 82A and 82B are positioned as shown, and the push handles 90A and 90B are extended, as shown.

However, when the wheeled apparatus 10 is used as a wheelchair, as shown in FIG. 2, the push handles 90A and 90B may be shortened, and the handgrips 82A and 82B may be rotated 180 degrees with respect to the foldable frame 12, thereby allowing the handgrips 82A and 82B to be used as armrests.

The mechanism for extending and shortening the push handles 90A and 90B and rotating the handgrips 82A and 82B will be described subsequently.

However, if desired, when the wheeled apparatus 10 is used as a wheelchair as shown in FIG. 2, the push handles 90A and 90B and the handgrips 82A and 82B may be positioned as shown in FIG. 1, so that another person, not shown, but same as the hands 80 and the feet 102 of FIG. 1, may push the person 78 who is using the wheeled apparatus 10 as a wheelchair.

Figure 11:
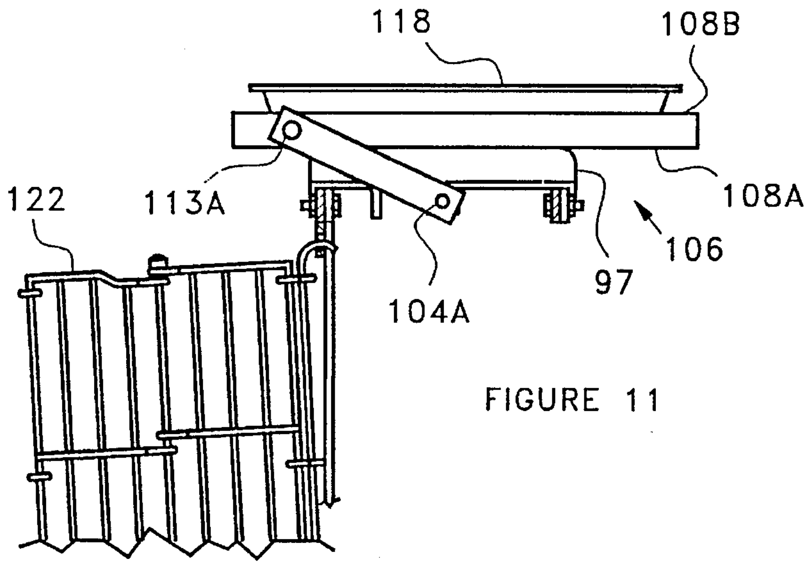
FIG. 11 is a side elevation of the seat back and seat-attaching bracket of FIG. 9, taken substantially the same as FIG. 9, with the shopping and parcel basket still removably attached to the seat frame as shown in FIG. 9, but showing both the seat back and luncheon tray of FIG. 9 folded rearwardly and downwardly toward the seat cushion for using the luncheon tray, or for allowing the frame to be folded as shown in FIG. 4 after removing the luncheon tray.
Figure 9:
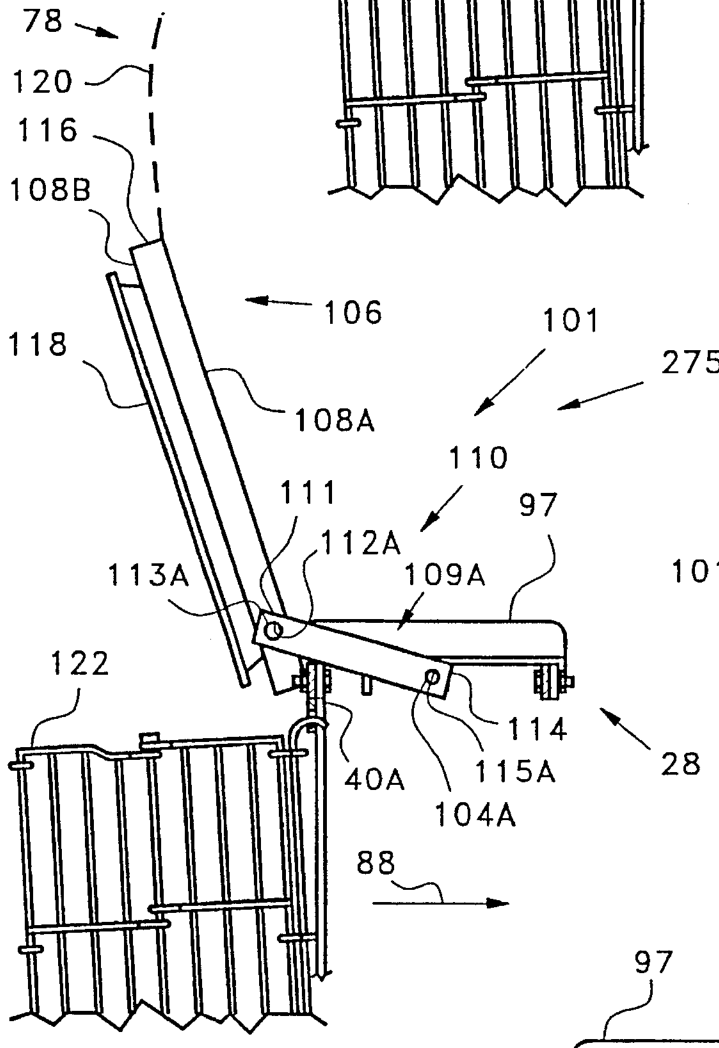
FIG. 9 is an enlarged side elevation, taken substantially the same as FIG. 1, of a preferred embodiment of the seat back and seat-attaching bracket, showing the seat back positioned for use facing rearwardly, showing a luncheon tray removably attached to the seat back, and showing a shopping and parcel basket removably attached to the seat frame and resting against the folding mechanism of the seat frame.
Figure 10:
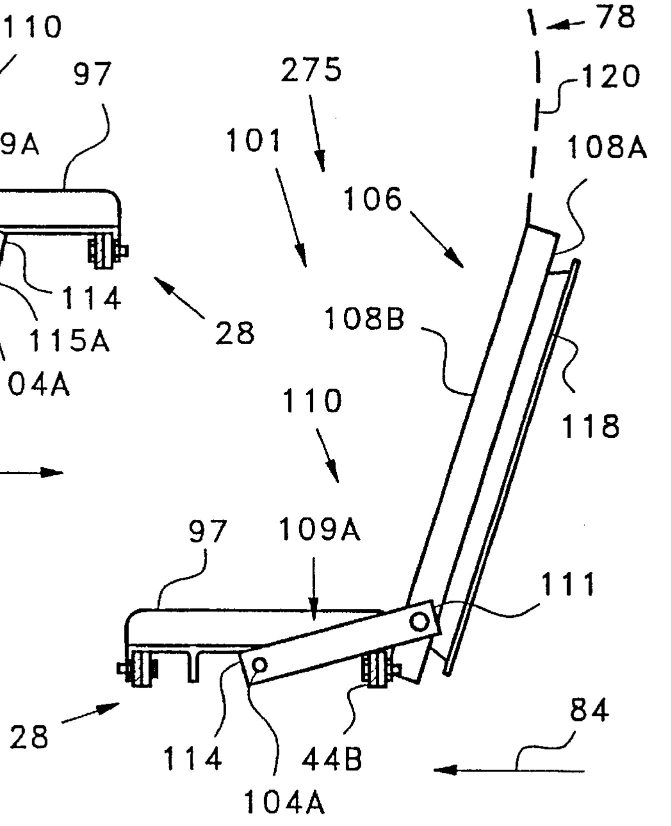
FIG. 10 is a side elevation of the seat back and seat-attaching bracket of FIG. 9, taken substantially the same as FIG. 9, but showing the shopping and parcel basket removed, showing the seat back positioned for use facing forwardly, and showing the luncheon tray of FIG. 9 removably attached to the opposite surface of the seat back.

Referring now to FIGS. 8–11, as shown in FIG. 8, a pair of pivot pins 104A and 104B extend outwardly from respective ones of the ends 32A and 32B of the seat frame 28. The seat back 106, as shown in FIGS. 9–11, having a first surface 108A and a second surface 108B, is attached to the pivot pin 104A by a seat link 109A. A similar seat link 109B, shown in FIG. 3, is used to attach the seat back 106 to the pivot pin 104B. Thus, the seat links 109A and 109B cooperate to serve as a seat-attaching bracket 110.

The seat link 109A of FIG. 3 includes an upper end 111 with a hole 112A that is pivotally attached to the seat back 106 by a pivot pin 113A, and the seat link 109A also includes a lower end 114 with a hole 115A that engages the pivot pin 104A of the seat frame 28. The seat link 109B is pivotally attached to the seat back 106 and to the seat frame 28 in like manner.

In FIGS. 8 and 9, the seat back 106 is positioned for sitting while facing in the rearward direction 88, and the seat link 109A is resting on the top front link 40A of the seat frame 28. The first surface 108A of the seat back 106 is engaging the front transverse member 30A of the seat frame 28, thereby preventing a top 116 of the seat back 106 from pivoting away from the seat cushion 97.

That is, engagement of the seat link 109A with the top front link 40A of the seat frame 28 supports the seat link 109A, thereby determining the vertical position of the hole 112A, and engagement of the first surface 108A of the seat back 106 with the front transverse member 30A prevents the top 116 of the seat back 106 from pivoting away from the seat cushion 97.

With the seat back 106 positioned as shown in FIG. 9, a luncheon tray 118 is removably attached, by any suitable means, not an inventive part of the invention, to the seat back 106 with the luncheon tray 118 being juxtaposed against the second surface 108B of the seat back 106.

In FIGS. 8–10, the seat back 106 is positioned for sitting while facing in the forward direction 84, the seat link 109A is resting on the top rear lug 44B of the side frame member 14A, and the second surface 108B of the seat back 106 is engaging the rear transverse member 30B of the seat frame 28. With the seat back 106 positioned as shown in FIG. 10, the luncheon tray 118 is removably attached by any suitable means, not an inventive part of the present invention, to the seat back 106 with the luncheon tray 118 being juxtaposed against the first surface 108A of the seat back 106.

That is, the luncheon tray 118 is attached to whichever surface 108A or 108B of the seat back 106 that is not being used for supporting a back 120 of the person 78 who is sitting on the seat cushion 97.

In FIG. 11, the seat back 106 has been pivoted around the pivot pin 113A and is folded down toward the seat cushion 97, and the luncheon tray 118 is on top of the seat back 106, thereby disposing the luncheon tray 118 generally horizontally.

As described for FIGS. 9 and 10 above, the bi-directional seating means 101 includes the seat cushion 97, the seat back 106, and the seat links 109A and 109B. The bi-directional seating means 101 not only provides means for sitting while facing either in the forward direction 84 or the rearward direction 88, but also provides means for supporting the luncheon tray 118 in a usable position, as shown in FIG. 11. The bi-directional seating means 101 also provides means for permitting the foldable frame 12 to be put into a folded position 121 as shown in FIG. 4, without removing the seat back 106. When the foldable frame 12 is in its closed position 121, the larger wheels 16A and 16B have a second wheel camber angle 123.

Referring now to FIGS. 6, 9, and 11, optionally, a shopping and parcel basket 122 is removably attached to the front transverse member 30A of the seat frame 28, and rests against the longer strut 48, the shorter strut 56, or both. As can be seen by comparing FIGS. 1 and 9, when the wheeled apparatus is used as a wheeled walker, parcels, not shown, may be left in the basket 122 while the luncheon tray 118 is being used.

Figure 12:
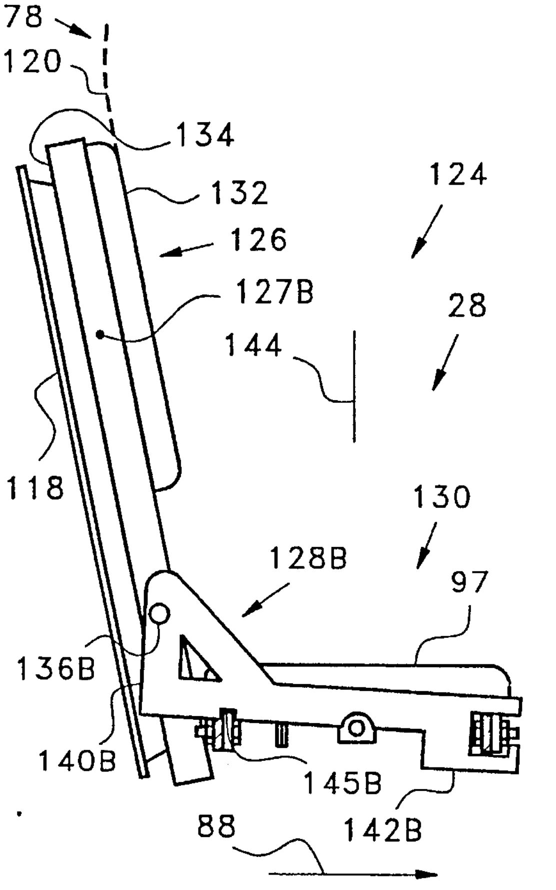
FIG. 12 is an enlarged side elevation, taken substantially the same as FIG. 1, of a first alternative embodiment of the seat back and seat-attaching bracket, showing the seat back positioned for use facing rearwardly, and showing a luncheon tray removably attached to the seat back.
Figure 13:
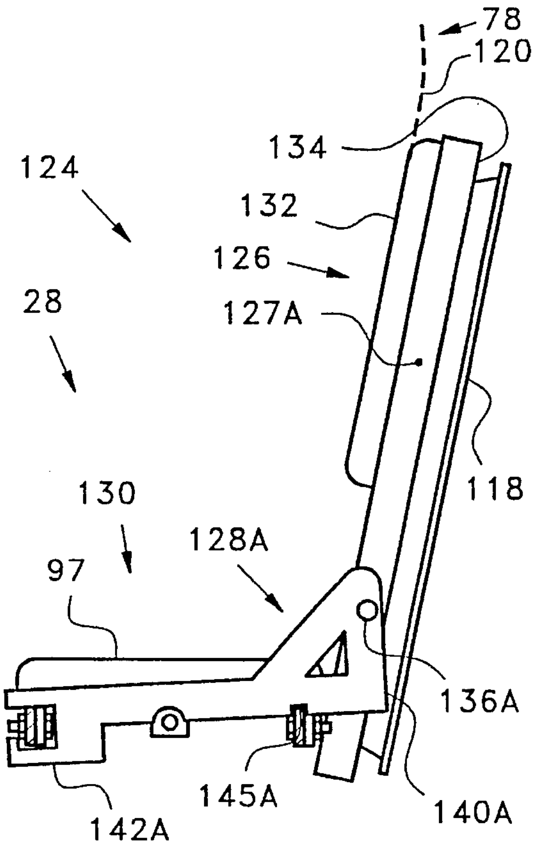
FIG. 13 is a side elevation of the seat back and seat-attaching bracket of FIG. 12, taken substantially the same as FIG. 12, showing the seat back positioned for sitting while facing forwardly after removing the seat attaching bracket from the seat frame, rotating both the seat-attaching bracket and the seat back 180 degrees around a vertical axis, and reattaching the seat-attaching bracket to the seat frame.
Figure 14:
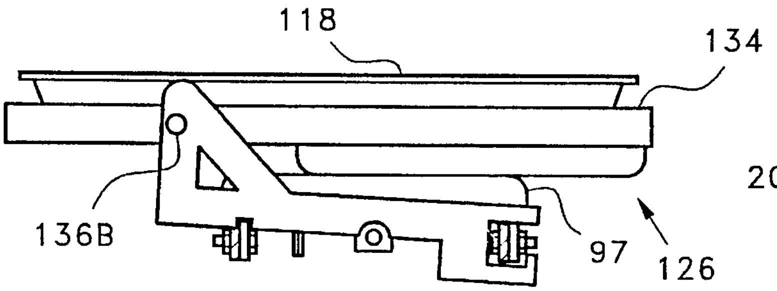
FIG. 14 is a side elevation of the seat back and seat-attaching bracket of FIG. 12, taken substantially the same as FIG. 12, but showing both the seat back and luncheon tray of FIG. 12 folded rearwardly and downwardly toward the seat cushion for using the luncheon tray, or for allowing the frame to be folded as shown in FIG. 4 after removing the luncheon tray.

Referring now to FIGS. 12–14, in a first alternate embodiment, a bi-directional seating means 124 includes the cushion 97 that is attached to the seat frame 28 of FIG. 3, a seat back 126 that includes both a left side 127A and a right side 127B, and a pair of seat links 128A and 128B which cooperate to provide a seat-attaching bracket 130.

The seat back 126 includes a back-supporting surface 132 and another surface 134; and the seat back 126 is pivotally attached to the seat cushion 97 by the links 128A and 128B, and by pivot pins 136A and 136B. Thus, the seat back 126 is pivotally attached to the seat-attaching bracket 130 which includes the seat links 128A and 128B.

As shown in FIG. 12, the bi-directional seating means 124 is positioned for sitting while facing in the rearward direction 88 for resting after using the wheeled apparatus 10 of FIG. 1 as a wheeled walker.

Referring now to FIGS. 8, 12, and 13, the seat-attaching bracket 130, with the seat link 128B thereof, is removed by lifting an end 140B of the seat link 128B, moving the seat-attaching bracket 130 in the forward direction 84, or leftwardly as viewed in FIG. 12, until an engaging yoke 142B is free from the top rear link 40B and the top rear lug 44B, lifting the seat-attaching bracket 130 and the seat back 126, rotating the seat-attaching bracket 130 and the seat back 126 one hundred eighty degrees around a vertical axis 144, and reattaching the seat-attaching bracket 130 to the wheeled apparatus 10 of FIG. 1 by slidably engaging the yoke 142B with the top front lug 36A and the front-attaching lug 38A.

The method for changing the bi-directional seating means 124 for use facing from one direction to the other, 84 or 88, includes manipulating the seat link 128A in the same manner as described above for the seat link 128B.

Whether the bi-directional seating means 124 is positioned for use facing in the forward direction 84 or in the rearward direction 88, the yoke 142B and a yoke 142A of the seat-attaching bracket 130 are secured to respective ones of the links 40A or 40B and the lugs 36A, 36B, 38A, 38B, 44A, or 44B, by locking notches, 145A and 145B, of the links, 128A and 128B.

Optionally, the luncheon tray 118 is attached to the other surface 134 of the seat back 126. Since the same surface, the back-supporting surface 132, is always used for supporting the back 120 of the user 78, the luncheon tray 118 may be either removably attached or permanently attached to the other surface 134 of the seat back 126.

Referring now to FIG. 14, the seat back 126 is foldable downwardly toward the seat cushion 97 by pivoting the seat back 126 around the pivot pin 136B. Since the seat back 126 is foldable downwardly toward the seat cushion 97, the seat back 126 may be left attached to the wheeled apparatus 10 of FIG. 1 for folding, unless the luncheon tray 118 remains attached to the other surface 134.

Figure 15:
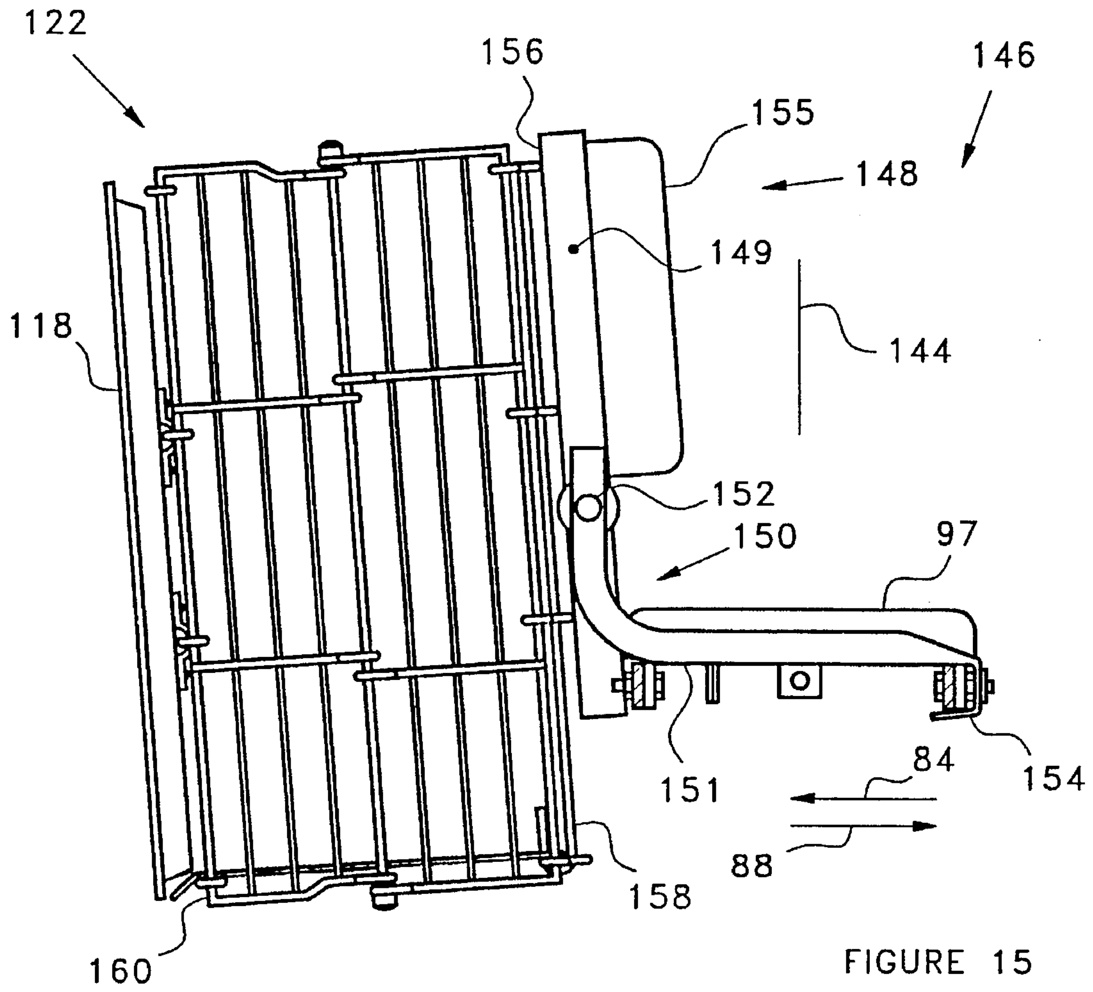
FIG. 15 is an enlarged side elevation of a second alternate seat construction, taken substantially the same as FIG. 1, in which the seat is usable facing either forwardly or backwardly by removing the seat back and the seat-attaching bracket and rotating them 180 degrees around a vertical axis, showing a foldable basket attached to the seat back, and showing a luncheon tray attached to the foldable basket.
Figure 16:
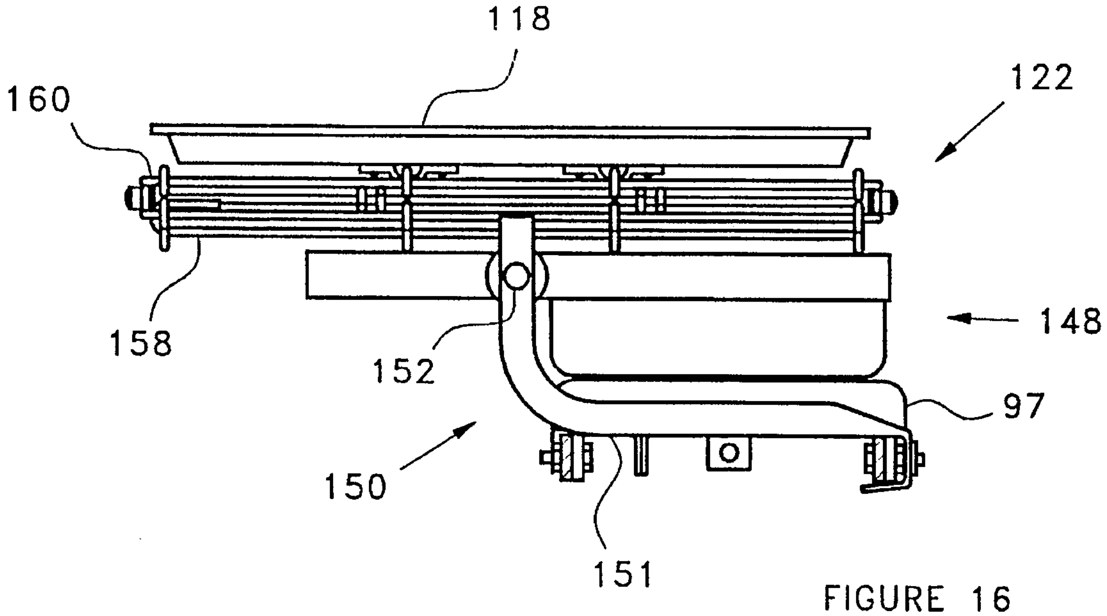
FIG. 16 is a side elevation of the second alternate seat construction of FIG. 15, taken substantially the same as FIG. 15, showing the seat back folded downwardly toward the seat cushion, showing the basket folded, and showing the luncheon tray on top of both the seat back and the folded basket.

Referring now to FIGS. 8, 15, and 16, in a second alternate embodiment, bi-directional seating means 146 includes the seat cushion 97, a seat back 148 with sides 149, right side shown, and a seat-attaching bracket 150. The seat-attaching bracket 150 includes a pair of seat links, 151, one shown, and the other a mirror image of the first. The seat links 151 are pivotally attached to the seat back 148 by pivot pins 152, one shown, the other identical. The seat back 148 is pivotal downwardly toward the seat cushion 97 around the pivot pins 152.

Each of the seat links, 151, includes a hook 154, one shown, the other identical. Since the seat links 151 include identical hooks 154, changing the direction of seating can be understood most easily by considering only one of the seat links 151 with its hook 154.

Changing the direction of seating of the bi-directional seating means 146, from facing in the forward direction 84 or in the rearward direction 88, is accomplished by sliding the hook 154 of the seat link 151 away from engagement with the link 40B and the lug 44B, or the link 36A and the lug 38A, lifting the seat-attaching bracket 150, rotating the seat-attaching bracket 150 one hundred eighty degrees around the vertical axis 144, and reattaching the hook 154 to two of the lugs, 36A and 38A, or 40B and 44B.

The seat back 148 includes a backrest surface 155 and another surface 156. Optionally, a first side 158 of the shopping and parcel basket 122 is attached to the other surface 156, and the luncheon tray 118 is attached to a second side 160 of the basket 122.

Optionally, the basket 122 is foldable with the second side 160 being movable toward the first side 158. Therefore, since the seat back 148 is pivotally attached to the seat-attaching bracket 150, and since the basket 122 is collapsible, the luncheon tray 118 may be positioned horizontally for eating, and may be positioned at a more usable height than would be possible if the basket 122 could not be folded.

Figure 19:
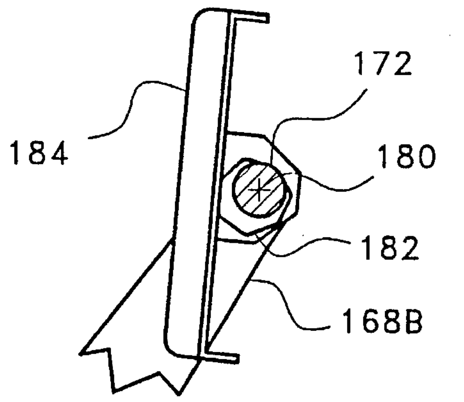
FIG. 19 is a partial side elevation of the third alternate seat construction of FIGS. 17 and 18, showing the upper portion of the seat back and lugs for preventing unlimited rotation of the seat back around a transverse axis.
Figure 18:
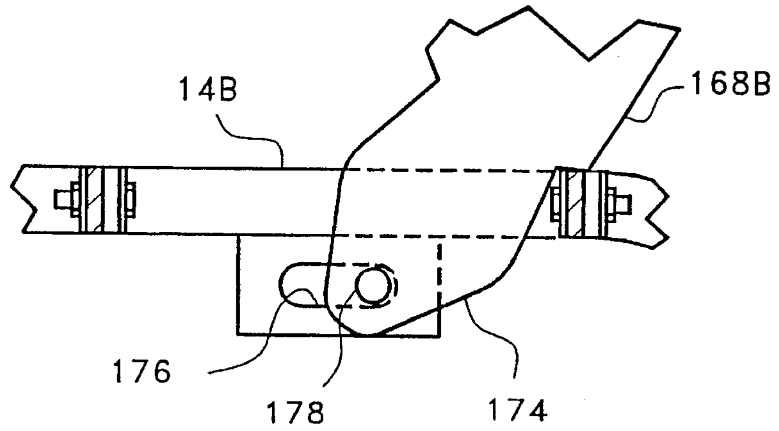
FIG. 18 is a partial and further enlarged side elevation of the third alternate seat construction of FIG. 17, showing the lower portion of the seat-attaching bracket positioned for sitting while facing forwardly.
Figure 17:
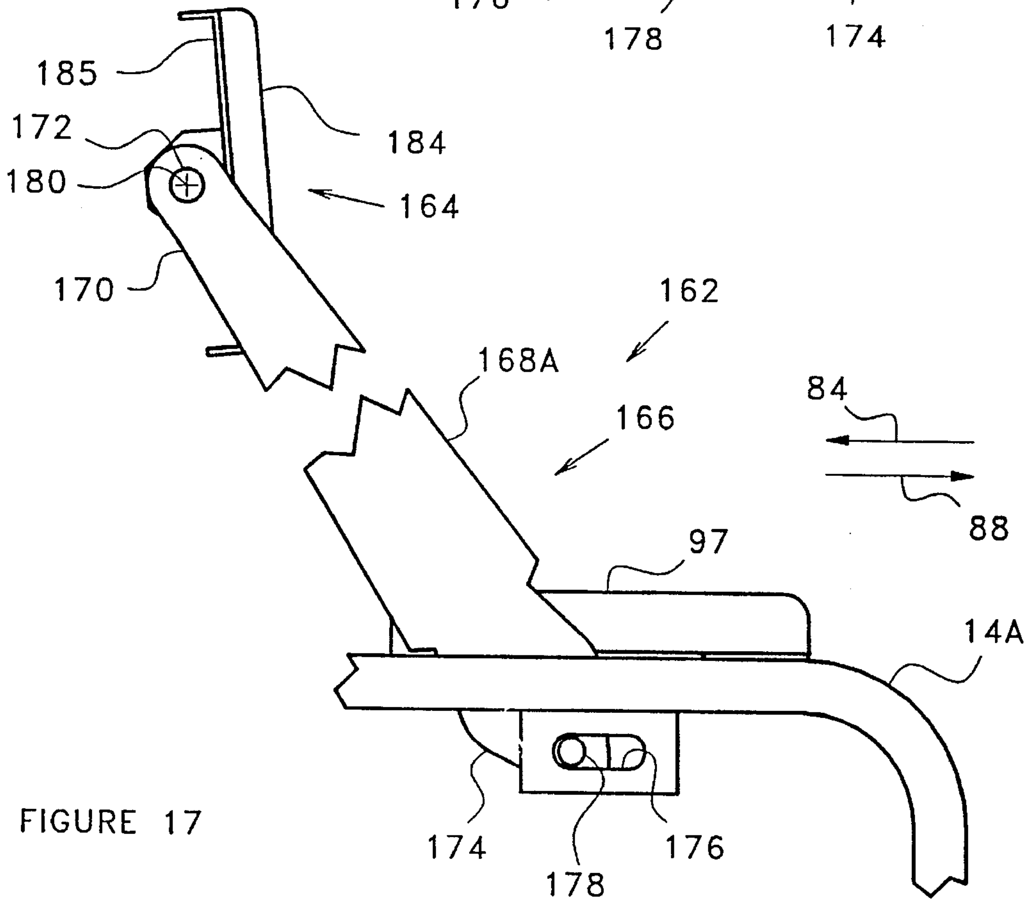
FIG. 17 is an enlarged side elevation of a third alternate seat construction, taken substantially as shown in FIG. 1, in which the seat is usable facing either forwardly or backwardly by sliding a lower pivotal connection of the seat-attaching bracket to the seat frame forwardly or rearwardly, rotating the seat-attaching bracket around the lower pivotal connection, and rotating the seat back around a transverse axis.

Referring now to FIGS. 17–19, in a third alternate embodiment, bi-directional seating means 162 includes the seat cushion 97, a seat back 164, and a seat-attaching bracket 166 that includes a pair of links 168A and 168B that are mirror images of each other. Each of the links 168A and 168B includes an upper end 170 that is pivotally attached to the seat back 164 by a pivot pin 172, and each of the links 168A and 168B includes a lower end 174 that is both pivotally and slidably attached to slots 176 of respective ones of the side frame members, 14A and 14B, by pins 178 that are fixedly secured to the seat-attaching bracket 166.

The seat back 164 may be positioned for sitting while facing either in the forward direction 84 or in the rearward direction 88 by pivotally positioning the upper end 170 of the seat-attaching bracket 166 around the pins 178, longitudinally positioning the pins 178 in the slots 176, and rotating the seat back 164 around a transverse axis 180 that is concentric with the pivot pin 172 until rotation is stopped by a rotation stop lug 182.

Further, as shown in FIGS. 17–19, the seat back 164 includes a backrest surface, or first surface, 184 and another surface, or second surface, 185, and the same surface is used as the backrest surface 184 whether the bi-directional seating means 162 is used facing in the forward direction 84 or in the rearward direction 88.

Referring now to FIGS. 1, 2, and 9–18 the seating means 101, 124, 146, or 162 provides rearward 186 and forward 187 facing seating, as shown in FIGS. 1 and 2, and as described above in conjunction with FIGS. 9–18.

Referring now to FIGS. 1–4, 20 and 21, in which some of the following numbers are seen in one drawing and others in another drawing, the wheeled apparatus 10 includes left and right footrest-attaching arms, 188A and 188B, each with a first end 189A or 189B, which are mirror images of each other. The footrest-attaching arms, 188A and 188B, each include an outer member 190A or 190B that is pivotally attached to one of the side frame members, 14A or 14B, by a pivot pin 192A or 192B, an inner member 194A or 194B that is both slidably installed inside and telescopically adjustable in the outer member 190A or 190B, and a footrest 195A or 195B that is pivotally attached to the inner member 194A or 194B by a pivot pin, 196A or 196B, as best seen in FIG. 3.

Figure 20:
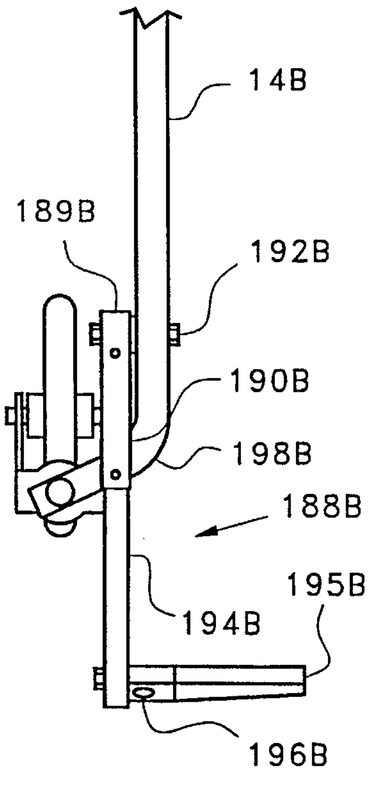
FIG. 20 is a partial top view, taken substantially as shown by view line 20—20 of FIG. 3, showing, as can also be seen in FIGS. 2 and 3, that the footrest-attaching arms are supportively engaged by the outwardly curved end portions of the side frames.

The footrest-attaching arms, 188A and 188B, may be pivoted upwardly around the pivot pins 192A and 192B for positioning the footrests 195A and 195B as shown in FIG. 1, and the footrests 195A and 195B may be folded as shown in FIG. 1. Or, the footrest-attaching arms, 188A and 188B, may by positioned for use as shown in FIGS. 2, 3, 20, and 21. When positioned for use, as shown in FIGS. 20 and 21, curved ends, or outwardly-curved end portions, 198A and 198B, of the side frame members, 14A and 14B, supportingly engage respective ones of the outer members 190A and 190B, thereby supporting the footrest-attaching arms, 188A and 188B.

The inner members 194A and 194B are telescopically positioned and locked in desired positions with respect to the outer members 190A and 190B by any suitable means, not an inventive part of the present invention.

Referring now to FIG. 21, a foot-leg rest 200 may be used in place of the footrests 195A and 195B of FIG. 3. The foot-leg rest 200 includes a web 201 that is attached to second ends 202A and 202B of the footrest-attaching arms, 188A and 188B. The ends 204A and 204B of the web 201 are secured to the footrest-attaching arms 188A and 188B by looping separate ends 204A or 204B of the web 201 around respective ones of the inner members 194A and 194B.

The inner members 194A and 194B may be the same shape as shown, straight, or bent to any desired shape that will provide optimum comfort for supporting the feet 102 and/or legs 206 of the user 78.

Figure 22:
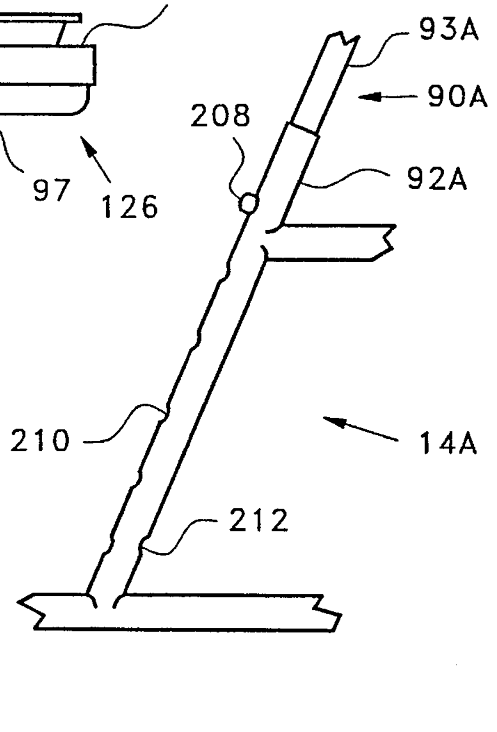
FIG. 22 is a partial and enlarged elevation, taken substantially the same as FIGS. 1 and 2, showing a portion of one of the push handles, and showing the positioning mechanism that adapts the handgrips of FIG. 1 for use as armrests, as shown in FIG. 2.

Referring now to FIGS. 1–3 and 22, as previously discussed, the left and right telescopically adjustable push handles, 90A and 90B, each includes the lower part 92A or 92B that is attached to one of the frame members 14A or 14B, and each includes the upper part 93A or 93B that slides inside a respective one of the lower parts 92A or 92B. As shown in FIGS. 1 and 22, the lower parts 92A and 92B are an integral part of the frame members 14A and 14B.

Referring now to FIGS. 1 and 22, and to the frame member 14A, thereof, the means for adjusting the length 207 of only one 90A of the push handles will be described, since the means for adjusting the length 207 of the other push handle 90B is identical.

When the wheeled apparatus 10 of FIG. 1 is to be used as a wheeled walker, the push handle 90A is rotationally positioned as shown in FIG. 1 and the handgrip 82A is selectively positioned for height by the steps of: 1) depressing a button latch 208 that projects through one of a plurality of handgrip-positioning holes 210, or that projects through an armrest positioning hole 212; 2) rotationally positioning the handgrip 82A; 3) telescopically positioning the upper part 93A of the telescopically adjustable push handle 90A in the lower part 92A; 4) aligning the button latch 208 with one of the holes 210; and 5) allowing the button latch 208 to extend through the selected one of the holes 210.

In like manner, when the wheeled apparatus 10 of FIG. 1 is used as a wheelchair, the push handle 90A is rotationally positioned as shown in FIG. 2, and the handgrip 82A is positioned for use as an armrest by the steps of: 1) depressing the button latch 208 that projects through one of the plurality of handgrip-positioning holes 120; 2) rotationally positioning the handgrip 82A; 3) telescopically positioning the upper part 93A of the push handle 90A in the lower part 92A: 4) aligning the button latch 208 with the armrest positioning hole 212; and 5) allowing the button latch 208 to extend through the hole 212.

The particular mechanism for carrying the button latch 208 in the upper part 93A is not shown, not being an inventive part of the present invention. Typically, this type of mechanism includes a hole that extends transversely through a side of an inner tube, such as the upper part 93A, a spring that presses the button latch radially outward from the inner tube, and means for retaining a part of the button latch inside the inner tube.

Referring again to FIGS. 5–8, and more particularly to FIGS. 5–7, in the following description various pivot points are discussed, all of which are disposed on longitudinal axes of the various pivot pins, such as the pivot pin 34A.

Referring now to FIG. 6, the asymmetrical linkage 15 includes: the seat frame 28, the top front lug 36A, the pivot pin 34A that pivotally attaches the seat frame 28 to the top front lug 36A, and a pivot point A around which the seat frame 28 pivots with respect to the right side frame member 14B; the top front lug 44A, the seat-supporting link 40A that is pivotally attached to the top front lug 44A by the pivot pin 42A, and a pivot point B around which the seat-supporting link 40A pivots; the pivot pin 46A that pivotally attaches the seat-supporting link 40A to the seat frame 28, and a pivot point C around which the seat-supporting link 40A pivots; the lower lug 50A, the longer strut 48 whose end 49 is pivotally attached to the lower lug 50A by the pivot pin 52A, and a pivot point D around which the longer strut 48 pivots; the pivot pin 54 that pivotally attaches the longer strut 48 to the seat frame 28, and a pivot point, or pivotal connection, E around which the longer strut 48 pivots; the lower lug 50B of the right frame member 14B, the shorter strut 56 whose end 57 is pivotally attached to the lower lug 50B by the pivot pin 52B, and a pivot point F around which the shorter strut 56 pivots; and a pivot pin 59 that pivotally attaches the end 58 of the shorter strut 56 to the longer strut 48, and a pivot point G around which the end 58 of the shorter strut 56 pivots, and that divides the longer strut 48 into a lower strut 214 and an upper strut 216.

Continuing to refer to FIG. 6 and the asymmetrical linkage 15 thereof, in a preferred embodiment, lengths AF and BD are 9.5 inches, lengths AC and BC are 8.375 inches, lengths DG and FG are 10.906 inches, length AE is 5.361 inches, and length EG is 3.925 inches.

When manufactured according to the aforesaid dimensions, the linkage 15 is an unequal sums linkage. That is, the sum of lengths AE and AF is purposely made unequal to the sum of lengths EG and FG. More particularly, the sum of lengths AE and AF is greater than the sum of lengths EG and FG by 0.030 inches. Or stated another way, the sum of lengths AE and AF is 0.2 percent greater than the sum of lengths EG and FG.

Referring now to FIGS. 3, 6, 7, and 23, curves in the graph of FIG. 23 show changes in wheel camber angle 60 of each wheel 16A and 16B that occur as the seat frame 28 is lifted when the asymmetrical linkage 15 is built according to various dimensions. The angle, in degrees, that the seat frame 28 is lifted from the position that is shown in FIG. 3 is designated $\alpha$ on the graph of FIG. 23, and the camber change angle, that is, the change in wheel camber angle 60 in degrees, is designated $\beta$.

More particularly, a curve identified as "+0.030" in the graph of FIG. 23 shows the camber change angle $\beta$ in degrees for each of the side frame members 14A and 14B and each of the wheels 16A and 16B that occurs as the seat frame 28 is raised α degrees when the asymmetrical linkage 15 is manufactured according to the dimensions give above.

If lengths AF, BD, AC, and BC are kept as listed above, but lengths DG and FG are 10.921 inches, length AE is 5.399 inches, and length EG is 3.881 inches, then the sum of lengths AE and AF is greater than the sum of lengths EG and FG by 0.097 inches or 0.7 percent. The resultant change of β vs. α is shown by a curve in FIG. 23 that is labeled "+0.097."

If lengths AF, BD, AC, and BC are kept as listed above, but lengths DG and FG are 10.899 inches, length AE is 5.343 inches, and length EG is 3.946 inches, then the sum of lengths AE and AF is substantially equal to the sum of lengths EG and FG. With these dimensions, the asymmetrical linkage 15 becomes an equal sums linkage, and the resultant change of β vs. α is shown in FIG. 23 by the curve labeled "0.000."

If lengths AF, BD, AC, and BC are kept as listed above, but length DG and FG are 10.893 inches, length AE is 5.327 inches, and length EG is 3.964 inches, then the sum of lengths AE and AF is less than the sum of lengths EG and FG by −0.030 inches. The resultant change of β vs. α is shown in FIG. 23 by a curve that is labeled "−0.030."

Continuing to refer to FIG. 23, the camber change angle β of curve "+0.030" exceeds 8.7 degrees at a seat angle α of 40 degrees, and then decreases to approximately 4.7 degrees at a seat angle α of 80 degrees; whereas the camber change angle β of the curve "+0.097" reaches almost 9.4 degrees at a seat angle α of 45 degrees, and then decreases to approximately 8.1 degrees at a seat angle α of 70 degrees.

When the asymmetrical linkage 15 is built as an equal sums linkage, as shown by the curve marked "0.000," the camber angle change β disappears at a seat angle α of 90 degrees; but when the asymmetrical linkage 15 is built with the sum of lengths AE and AF being smaller than the sum of lengths EG and FG by 0.030 inches, as shown by the curved marked "−0.030," then the camber change angle β decreases to zero at approximately 81 degrees, and becomes negative at larger seat angles α.

When the asymmetrical linkage 15 of FIG. 6 is built as an unequal sums linkage, with the sum of lengths AE and AF larger than the sum of lengths EG and FG, then raising of the seat frame 28 is limited by the unequal sums linkage forming a triangle 221, as shown in FIG. 7. That is, the seat frame 28 cannot be raised beyond the seat angle α at which the pivot pins 54, 59, 52A, and 52B are in a straight line 222. At this time, the lengths of the sides of the triangle 221 are: length AE, length AF, and the sum of lengths EG and FG.

With the dimensions used for the "+0.030" curve of FIG. 23, the limiting seat angle α is approximately 82.5 degrees, and for the "+0.097" curve of FIG. 23, the limiting seat angle α is approximately 76.4 degrees.

Referring now to FIGS. 3 and 4, to avoid the cost of shipping by freight, it is customary to limit the package size to a height plus girth limit of 130 inches. The present invention utilizes both the folding of the frame 12, and the camber-decreasing function of the asymmetrical linkage 15 of FIG. 6 to reduce the required shipping container to a minimum.

A height 223 determines one of the dimensions of a shipping package, not shown. As can be seen by inspection of FIG. 4, the height 223 would increase if the seat frame 28 were folded 90 degrees upwardly from the horizontal position of FIG. 3. Therefore, if folding the seat frame 28 upwardly to 90 degrees did not decrease a width 224 of the wheeled apparatus 10, then raising the seat frame 28 upwardly to 90 degrees would increase the required size of the shipping container.

Referring to FIGS. 3, 6, and 23, it has been shown that the asymmetrical linkage 15, when built as an unequal sums linkage with an inequality of +0.030 inches, will reduce or eliminate negative camber when the foldable frame 12 is folded. When built as an equal sums linkage, the asymmetrical linkage 15 will eliminate a negative camber angle 60 of 3.6 degrees with a seat angle α as large as 75 degrees, as shown in FIG. 23. Even when built with a negative sum of −0.030 inches, even though the camber change angle β becomes negative at about 81 degrees, as shown in FIG. 23, the asymmetrical linkage 15 will eliminate a camber angle 60 of at least 4 degrees at a seat angle α of 70 degrees.

Therefore, the asymmetrical linkage 15 is useful when the dimensions of the linkage 15: 1) provide a positive value of unequal sums; 2) provide an equal sums linkage; and 3) provide a negative value of unequal sums.

As shown by the dimensions given on the curves of FIG. 23, it is not only possible to achieve the necessary camber change angle β, but, when built to some dimensions, the amount of camber change angle β at a given seat angle α may be excessive.

Referring now to FIGS. 6, 7, and 24–26, a resilient mechanism 226 may be used in conjunction with the wheeled apparatus 10 of FIG. 3 to limit a camber change angle β that might become excessive, or to allow the seat frame 28 to be raised upwardly above the seat angle α which is limited by the linkage 15 of lengths AE, EG, FG, and AF.

The resilient mechanism 226 is installed in the linkage 15 of lengths AE, EG, FG, and AF and the pivot point A. More particularly, referring to FIG. 8, the resilient mechanism 226 places the top front lug 36A of the side frame member 14B, the front-attaching lug 38A of the seat frame 28, and the pivot pins 34A and 34B by a pivot pin 228 that extends through the top rear lug 36B and the rear-attaching lug 38B.

Referring now to FIGS. 24 and 25, FIG. 24 is taken substantially the same as FIG. 1, and substantially as shown by section line 24—24 of FIG. 25. As previously noted, the resilient mechanism 226 replaces the top front lug 36A which is best seen in FIG. 8. FIG. 25 is taken substantially the same as FIG. 3, and substantially as shown by section line 25—25 of FIG. 24.

Referring now to FIGS. 1, 8, and 24–26, the resilient mechanism 226 includes a body 230 with a longitudinally-disposed and vertically-elongated slot 232, the pivot pin 228 that extends through the slot 232, a lug 234 that is fixedly secured to the pivot pin 228 and to the seat frame 28 by any suitable means, not an inventive part of the present invention, a detent cam 236 that is fixedly secured to the pivot pin 228, a spring-retaining cam follower 238 that is disposed in a bore 240 in the body 230, and a spring 242.

When the foldable frame 12 is in the open position 47, as shown in FIG. 3, and when no one is sitting on the seat cushion 97, the pivot pin 228 is pressed upwardly, as shown in FIG. 24, by the spring 242; but when a person 78 is sitting on the seat cushion 97, the pivot pin 228 is forced downwardly, as shown in FIG. 26, against the spring 242. Preferably, the pivot pin 228 fits loosely in the top rear lug 36B and in the rear-attaching lug 38B so that the pivot pin 228 does not attempt to function as a cantilever spring when the pivot pin 228 is forced downwardly in the slot 232.

Referring also to FIG. 6, when the foldable frame 12 is folded, the dimension of length AF is determined by the spring 242 pushing the pivot pin 228 upwardly in the slot 232, as seen in FIG. 24. When in the process of folding the asymmetrical linkage 15, the force of the spring 242 is overcome, the dimension of length AF resiliently decreases.

The resilient mechanism 226, when installed in the linkage 15 that includes the lengths AE, EG, FG, and AF, either limits the change in camber angle 60 of FIG. 3 when pivot points D and F are at a minimum distance apart, and/or allows the seat frame 28 to be raised to an angle α above that which would be allowed by the lengths AE, EG, FG, and AF.

More particularly, when the resilient mechanism 226 is installed at the pivot point A, wherein the seat frame 28 is pivotally attached to the side frame member 14B, the resilient mechanism 226 allows the dimension of length AF to be resiliently decreased.

Referring now to FIGS. 6, 7, and 24, as the seat frame 28 is forced upwardly, and the dimension of length AF resiliently decreases, the seat frame 28 can be lifted to a greater angle α then that allowed by the linkage 15 formed by the dimensions of lengths AE, EG, FG, and AF.

In addition, if the dimension of length DF is at a minimum by metal-to-metal contact of the frame members 14A and 14B, or if the distance between the side frame members 14A and 14B is at a minimum because of the pivot points D and F coinciding, the resilient mechanism 226 will allow the seat frame 28 to be raised to whatever angle α results in the dimension of length AB being reduced to a minimum, such as determined by a mechanical stop 244 that limits the dimension of length AB to a dimension 246, as seen on FIG. 7.

Therefore, the resilient mechanism 226, or any other suitable resilient mechanism, may be used to limit the camber change angle β to a desired angle β, or to increase the angle α to which the seat frame 28 can be raised.

While the resilient mechanism 226 has been shown and described as being inserted at the pivot point A of FIG. 6, examination of the triangle 221 of FIG. 7 reveals that a resilient mechanism, such as the resilient mechanism 226, instead of being inserted at the pivot point A, could be inserted at another pivot point, such as one of the pivot points, E, F, or G.

In addition, referring also to the four curves of FIG. 23, it should be noticed that the dimensions to which the asymmetrical linkage 15 is built are critical. In accordance with the preceding discussion of the resilient mechanism 226, it can seen that the resilient mechanism 226 can be used to loosen manufacturing tolerances. That is, dimensions may be used that result in an excessive camber change angle β, and the resilient mechanism 226 may be used to limit the camber change angle β.

Referring again to FIGS. 6, 25, and 26, and more particularly to FIG. 26, the detent cam 236 includes a recessed portion 248 that cooperates with the spring 242 to resiliently latch the seat frame 28 at a preferred seat angle α, such as that shown by phantom lines 250. Therefore, when the seat frame 28 is raised to the desired seat angle α, or when the seat frame 28 is raised to the angle α wherein the camber change angle β is decreased to a desired value, the seat frame 28 is resiliently held at that seat angle α by the latching action of the recessed portion 248, the cam follower 238, and the spring 242.

In the four curves of the graph of FIG. 23, the dimension of length AF is 9.5 inches and the dimension of length AB is 16.75 inches when the foldable frame 12 is in the open position 47 of FIG. 5. Thus, the ratio of length AB to length AF is 1.763.

Continuing to refer to FIGS. 6 and 23 for comparison, although not shown in a graph, if the dimension of length AF is increased 20 percent from 9.5 inches to 11.4 inches, and if an equal sums linkage is built, lengths DG and FG become 11.661 inches, the ratio of length AB to length AF decreases to 1.469, and the maximum camber change angle β decreases to 7.1 degrees. However, if the dimension of length AF is decreased 20 percent from 9.5 inches to 7.6 inches, and if an equal sums linkage is built, lengths DG and FG become 10.183 inches, the ratio of length AB to length AF increases to 2.204, and the maximum camber change angle β increases to 10.7 degrees. Thus, it can be seen that the resultant camber change angle β can be selectively determined by proportioning the lengths AB and AF.

Figure 27:
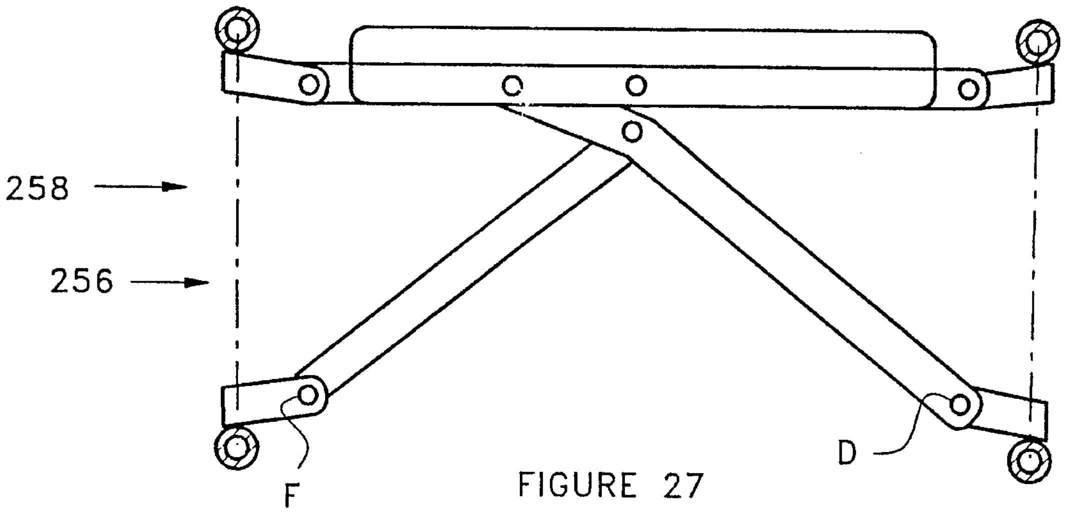
FIG. 27 is a front elevation of an alternate folding mechanism, built according to the bent strut principle described herein, taken substantially the same as FIGS. 3 and 5, showing the folding mechanism in an open position thereof.
Figure 28:
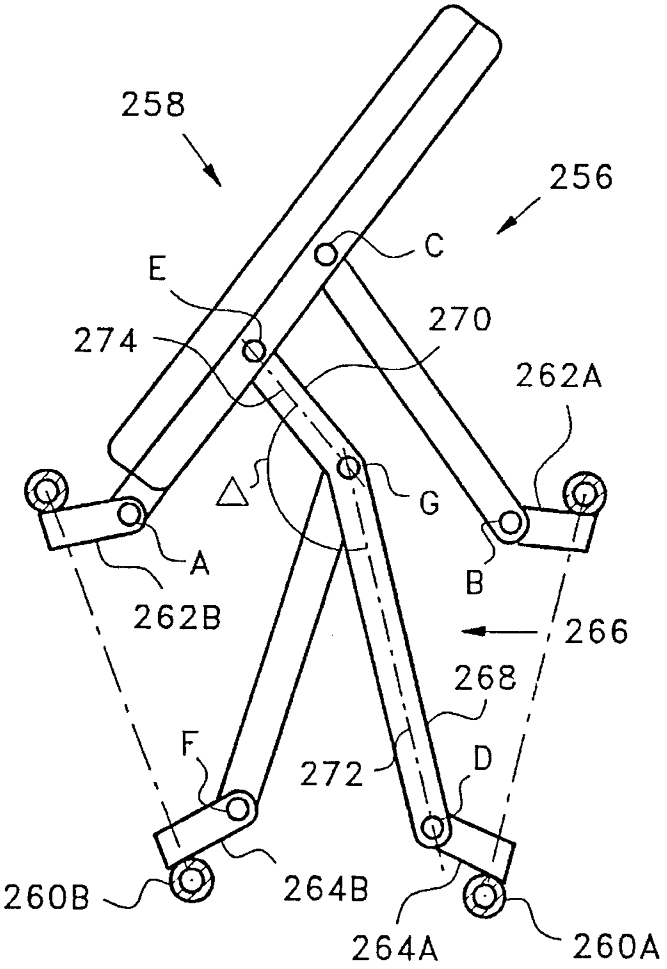
FIG. 28 is a front elevation of the alternate folding mechanism of FIG. 27, taken substantially the same as FIG. 27, and showing the alternate folding mechanism in a partially folded position.
Figure 29:
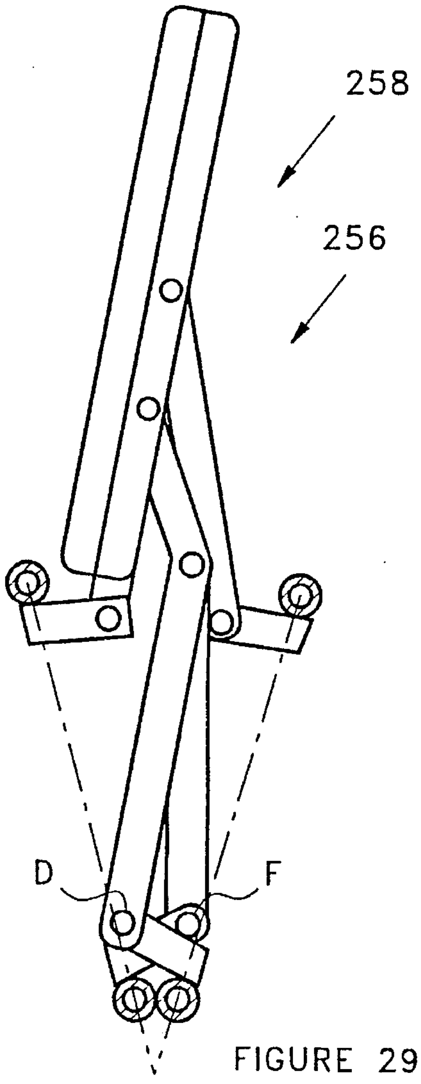
FIG. 29 is a front elevation of the alternate folding mechanism of FIGS. 27 and 28, taken substantially the same as FIGS. 27 and 28, and showing the alternate folding mechanism in a completely folded position wherein the lower attachment points to the side frame members have crossed as the frame is folded.

Referring now to FIGS. 27–29, in an alternative embodiment, an asymmetrical linkage, or asymmetrical folding mechanism, 256 of a foldable frame 258 generally includes not only parts as named and numbered in conjunction with the detailed description of the asymmetrical linkage 15 of FIGS. 5–7, but also alphabetically designation pivot points A–G that generally correspond to the those of the asymmetrical linkage 15. Further, the operation of the asymmetrical linkage 256 is generally as described for the asymmetrical linkage 15.

However, there are some significant differences, and these differences provide some distinct advantages.

More particularly: a right side frame member 260B of the foldable frame 258 includes a top front lug 262B that extends inwardly and that slopes downwardly and a lower lug 264B that extends inwardly and that slopes upwardly; and a left side frame member 260A of the asymmetrical linkage 256 includes a top front lug 262A that extends inwardly and that slopes downwardly and a lower lug 264A that extends inwardly and that slopes upwardly. There are two advantages to this sloping of the lugs 262A, 262B, 264A, and 264B.

One advantage is that the ratio of length AB to length AF is increased. As shown in conjunction with the asymmetrical linkage 15 of FIGS. 5–7 and the graph of FIG. 23, increasing this ratio increases the camber change angle β that is achieved. This is true if the asymmetrical linkage 15 is constructed with dimensions that make it: 1) an unequal sums linkage with the sum of lengths AF and AE being greater than the sum of lengths EG and FG; 2) an equal sums linkage with the sum of lengths AF and AE being substantially equal to the sum of lengths EG and FG; or 3) an unequal sums linkage with the sum of lengths AF and AE being smaller than the sum of lengths EG and FG. In like manner, increasing the ratio of length AB to length AF provides the same beneficial advantages for the asymmetrical linkage 256.

The other advantage is that the sloped lugs 262A, 262B, 264A, and 264B allow the asymmetrical linkage 256 to "cross its legs." That is, the pivot points D and F can cross. As shown in FIGS. 27 and 28, the pivot point F is to the left of the pivot point D, but in FIG. 29, when the foldable frame 258 is fully folded, the pivot point F is on the right side of the pivot point D.

Another difference in the asymmetrical linkage 256 of the foldable frame 258 is that it includes a bent strut 266. The bent strut 266 is divided into a lower strut 268 and a bent arm 270 by the pivot point G. The bent arm 270 is bent at an angle Δ, as measured from a line 272 that intercepts the pivot points D and G to a line 274 that intercepts the pivot points EG.

Referring to FIGS. 6 and 28, the lower strut 214 and the upper strut 216 are integral parts of the longer strut 48. This integral construction of the struts 214 and 216 provides a rigid connection therebetween. Likewise, a rigid connection of the lower strut 268 to the bent arm 270 consists of the lower strut 268 and the bent arm 270 being integral parts of the bent strut 266.

Referring now to FIGS. 28 and 30, three curves on the graph of FIG. 30 show the camber change angle β per wheel 16A and 16B of FIG. 3 vs. the seat angle α when the strut 266, is straight, is bent 10 degrees, and is bent 20 degrees. The asymmetrical linkage 256 is manufactured with lengths AF and BD equal to 9.5 inches, lengths AC and BC equal to 8.375 inches, and lengths DG, FG, AE, and EG proportioned to form an equal sums linkage.

As shown by the curve "0.000" of FIG. 23, and by the curve "0 DEGREES" of FIG. 30, the camber change angle β decreases to zero at a seat angle α of 90 degrees when an asymmetrical linkage, such as the asymmetrical linkage 15, is built with a straight strut, such as the strut 48 of FIG. 5.

However, when the strut 266 of FIGS. 27–29 is bent to 10 degrees, as shown in FIG. 30, the camber change angle β increases to a maximum of 11.9 degrees at a seat angle α of 45 degrees, and the camber change angle β is still 7.3 degrees at a seat angle α of 85 degrees. In like manner, when the strut 266 is bent to 20 degrees, as shown in FIG. 30, a maximum camber change angle β of 16 degrees occurs at a seat angle α of 55 degrees, and the camber change angle β is still 11.8 degrees at a seat angle α of 85 degrees.

Thus, it can be seen that bending the strut 266 to increasing angles: 1) increases the maximum camber change angle β; 2) increases the seat angle α at which the maximum camber change angle β occurs; and 3) increases the camber change angle β quite substantially at higher seat angles α, whereas without a bend in the strut 266, the camber change angle β drops to zero at a seat angle α of 90 degrees.

Referring now to FIGS. 28, 30 and 31, the curves of FIG. 30 show the effects of bending the strut 266 of the asymmetrical linkage 256 when built as an equal sums linkage. FIG. 31 shows the effect of changing dimensions to produce an unequal sums linkage in which the sum of lengths AE and AF is greater then the sum of lengths EG and FG by 0.029 inches, and for an unequal sums linkage in which the sum of lengths AE and AF is less than the sum of lengths EG and FG by 0.029 inches.

As shown in FIG. 30, the camber change angle β varies with changes in seat angle α in a manner similar to the asymmetrical linkage 256 of FIG. 28 when built as an equal sums linkage. However, there are important differences. Most importantly, on the curve "10 DEGREES," instead of the camber change angle β disappearing at a seat angle α of 90 degrees, a significant camber change angle β exists at a seat angle α of 90 degrees. Also, on the curve "10 DEGREES," the maximum camber change angle β is above 11.9 degrees for the asymmetrical linkage 256 of FIG. 28 when built as an unequal sums linkage, whereas, on the curve "0 DEGREES," the maximum camber change angle β is about 8.5 degrees for the asymmetrical linkage 256 of FIG. 28 when built as an equal sums linkage.

When the asymmetrical linkage 256 of FIGS. 27–29 is built with dimensions that make the sum of lengths AE and AF larger than the sum of lengths EG and FG, the bent strut 266 provides the same general advantages over the embodiments of FIG. 5–7. That is, a greater maximum camber change angle β is achieved, and a larger camber change angle β is maintained at large seat angles α.

When the asymmetrical linkage 15 of FIGS. 5–7 is built with dimensions that make the sum of lengths AE and AF smaller than the sum of lengths EG and FG, as shown in FIG. 23, the camber change angle β goes to zero at approximately 80 degrees, and then goes negative. However, when the asymmetrical linkage 256 is built with dimensions that make the sum of lengths AE and AF smaller than the sum of lengths EG and FG, the bent strut 266 either increases the seat angle α at which the camber change angle β goes to zero, or, depending upon the angle Δ, continues a positive camber change angle β all the way to a seat angle α of 90 degrees.

As shown by the preceding description, the camber change angle β vs. the seat angle α, is dependent upon, and can be selectively determined by, not only selectively changing the angle Δ of the strut 266, but also selectively changing various dimensions to produce an equal sums linkage with substantially equal sums, and unequal sums linkage with a positive difference in sums, or an unequal sums linkage with a negative difference in sums.

Referring now to FIGS. 24–29, the resilient mechanism 226 of FIGS. 24–26, while described in conjunction with the asymmetrical linkage 15 of FIGS. 5–7, may also be used with the asymmetrical linkage 256 of FIGS. 27–29 in the manner described in conjunction with FIGS. 5–7.

Further, as can be seen by inspecting the various drawings, the resilient mechanism 226 of FIGS. 24–26 can be inserted into either the asymmetrical linkage 15 of FIGS. 5–7, or the asymmetrical linkage 256 of FIGS. 27–29, at any pivot point, such as the pivot points A, E, F, or G, and thereby used to allow resilient change in such dimensions as lengths AF, AE, EG, or FG.

Referring now to FIGS. 4, 6, 24–26, and 28, purposes for inserting the resilient mechanism 226 into either of the asymmetrical linkages, 15 or 256, include: allowing an increase in manufacturing tolerances by resiliently compensating for the effect of the increased tolerances; allowing the width 224 of the wheeled apparatus 10 to be resiliently decreased for insertion into a shipping container; resiliently allowing an increase in the seat angle α and a decrease in the distance between pivot points A and B when tolerances result in an excessive camber change angle β, and a minimum distance occurs between pivot points D and F before the distance between pivot points A and B is reduced satisfactorily; allowing the seat angle α to be resiliently decreased for minimizing the height 223 of the wheeled apparatus 10 when folded; and/or allowing the wheeled apparatus 10 to be shipped completely assembled and ready to use.

Referring now to FIGS. 9–11, a seat assembly 275 includes the seat frame 28, the seat cushion 97, the seat back 106, and the seat-attaching bracket 110.

Finally, referring to FIGS. 1–3, the wheeled apparatus 10 includes brakes 276 that can be actuated, as shown in FIGS. 1 and 2, by a person 78 without removing the hands 80 from the handgrips 82A and 82B.

While specific apparatus and method have been disclosed in the preceding description, and while part numbers have been inserted parenthetically into the claims to facilitate understanding of the claims, it should be understood that these specifics have been given for the purpose of disclosing the principles of the present invention and that many variations thereof will become apparent to those who are versed in the art. Therefore, the scope of the present invention is to be determined by the appended claims, and without any limitation by the part numbers inserted parenthetically in the claims.

INDUSTRIAL APPLICABILITY

The present invention is applicable to wheeled apparatus for use as a wheelchair, for use as a wheeled walker, for other uses in which wheeled apparatus includes a foldable frame, a bi-directional seat for use with apparatus whether wheeled or not, apparatus in which both a seat cushion and a seat back are folded between parts of a foldable frame whether or not wheels are included, apparatus that includes a foldable frame and negatively-cambered wheels whether or not a seat is included, and handgrips that can be used as arm-rests with any suitable apparatus.

What is claimed is:

1. Wheeled apparatus (10) which comprises a frame (12 or 258) having a longitudinal axis (20), first (16A) and second (16B) transversely spaced-apart wheels being operatively attached to said frame, a third wheel (24A) being longitudinally spaced from said first and second wheels and being operatively attached to said frame, and a seat cushion (97) and a seat back (106, 126, 148, 164) being operatively attached to said frame, the improvement which is characterized by:

said frame (12 or 258) being foldable between open (47) and folded (121) positions;

means, comprising a push handle (90A or 90B), for using said apparatus as either a wheelchair or a wheeled walker; and bi-directional seating means (101, 124, 146, or 162) for selectively positioning said seat back toward said push handle when said apparatus is used as a wheelchair, and away from said push handle when said wheeled apparatus is used as a wheeled walker.

2. Wheeled apparatus (10) as claimed in claim 1 in which:

said first (16A) and second (16B) wheels are cambered when said frame (12 or 258) is in said open position .(47); and said wheeled apparatus comprises means for automatically changing said camber when said frame is folded.

3. Wheeled apparatus (10) as claimed in claim 1 in which said operative attachment of said first (16A) and second (16B) wheels to said frame (12 or 258) comprises first (22A) and second (22B) axles;

said push handle (90A or 90B) comprises a handgrip (82A or 82B); and said wheeled apparatus includes means, comprising said handgrip being disposed at a predetermined longitudinal location (95) with respect to said axles, for preventing said wheeled apparatus from overturning backwardly when using said wheeled apparatus as said wheeled walker.

4. Wheeled apparatus (10) as claimed in claim 3 in which said handgrip (82A or 82B) includes a center (94); and said predetermined longitudinal location (95) of said handgrip comprises said center of said handgrip being disposed longitudinally intermediate of said axles (22A and 22B) and said third wheel (24A).

5. Wheeled apparatus (10) as claimed in claim 1 in which said wheeled apparatus includes means, comprising means for rotating a handgrip (82A or 82B) with respect to said frame (12 or 258), for using said handgrip as an armrest.

6. Wheeled apparatus (10) as claimed in claim 5 in which said means for using said handgrip (82A or 82B) as an armrest further comprises means for selectively adjusting a length (207) of said push handle (90A or 90B).

7. Wheeled apparatus (10) as claimed in claim 1 in which said bi-directional seating means (101, 124, 146, or 162) includes means, comprising means for folding said seat back (106, 126, 148, or 164) down toward said seat cushion (97), for permitting said frame to be folded without removing said seat back from said wheeled apparatus.

8. Wheeled apparatus (10), as claimed in claim 7 in which;

said first (16A) and second (16B) wheels are negatively cambered when said frame is in said open position; and said apparatus includes means, comprising said foldable frame, for automatically reducing said camber by more than 50 percent when said foldable frame is in said folded position.

9. Wheeled apparatus (10) as claimed in claim 7 in which said foldable frame comprises left (14A or 260A) and right (14B or 260B) frame members and an asymmetrical folding mechanism (15 or 256) that operatively interconnects said left and right frame members;

said first (16A) and second (16B) wheels are cambered; and said apparatus includes means, comprising said asymmetrical folding mechanism, for automatically changing said camber when said frame is folded.

10. Wheeled apparatus (10) as claimed in claim 1 in which said operative attachment of said seat back (106 or 148) to said frame (12 or 258) comprises a seat-attaching bracket (110 or 166) having a lower end (114 or 174) operatively attached to said frame, and having an upper end (111 or 170) operatively attached to said seat back; and said means for selectively positioning said seat back toward and away from said push handle (90A or 90B) comprises means for pivotally positioning said seat-attaching bracket around said operative attachment of said lower end to said frame.

11. Wheeled apparatus (10) as claimed in claim 10 in which said operative attachment of said seat cushion (97) to said foldable frame (12 or 258) comprises a seat frame (28), said foldable frame comprises left (14A or 260A) and right (14B or 260B) frame members, and an asymmetrical folding mechanism (15 or 256) that operatively interconnects said left and right frame members, and said asymmetrical folding mechanism comprises:

said seat frame being pivotally attached to one (14B or 260B) of said frame members;

a top link (40A) being pivotally attached to the other (14A or 260A) of said frame members, and being pivotally attached to said seat frame distal from the first said pivotal attachment thereto;

a longer strut (48) being pivotally attached to said other frame member, and being pivotally attached to said seat frame intermediate of previously recited pivotal attachments thereto; and a shorter strut (56) being pivotally attached to said one frame member, and being pivotally attached to said longer strut intermediate of previously recited pivotal attachments thereto.

12. Wheeled apparatus (10) which comprises a frame (12 or 258) having a longitudinal axis (20), first (16A) and second (16B) transversely spaced-apart wheels being operatively attached to said frame, a third wheel (24A) being longitudinally spaced from said first and second wheels and being operatively attached to said frame, and a seat cushion (97) and a seat back (106, 126, 148, 164) being operatively attached to said frame, the improvement which is characterized by:

means, comprising a push handle (90A or 90B), for using said apparatus as either a wheelchair or a wheeled walker;

bi-directional seating means (101, 124, 146, or 162) for selectively positioning said seat back toward said push handle when said apparatus is used as a wheelchair, and away from said push handle when said wheeled apparatus is used as a wheeled walker;

said operative attachment of said seat back (106 or 148) to said frame (12 or 258) comprising a seat-attaching bracket (110 or 166) having a lower end (114 or 174) operatively attached to said frame, and having an upper end (111 or 170) operatively attached to said seat back; and said means for selectively positioning said seat back toward and away from said push handle (90A or 90B) comprises means for rotationally positioning said seat back around said operative attachment of said upper end of said seat-attaching bracket to said seat back.

13. Wheeled apparatus (10) as claimed in claim 12 in which said means for selectively positioning said seat back toward and away from said push handle (90A or 90B) further comprises means for pivotally positioning said seat-attaching bracket (110) around said operative attachment of said lower end (114) thereof to said frame, and means for preventing said seat back from rotating backwardly and downwardly, with respect to said seat cushion (97), around said operative attachment of said seat back to said upper end (111) of said seat-attaching bracket.

14. Wheeled apparatus (10) as claimed in claim 12 in which said means for selectively positioning said seat back toward and away from said push handle (90A or 90B) further comprises means for pivotally positioning said seat-attaching bracket (110) around said operative attachment of said lower end (114) thereof to said frame, and means for preventing said seat back from rotating backwardly and downwardly, with respect to said seat cushion (97), around said operative attachment of said seat back to said upper end (111) of said seat-attaching bracket; and said bi-directional seating means (101) includes means, comprising said seat-attaching bracket, for allowing said seat back to be folded onto said seat cushion whether said seat back is positioned toward or away from said push handle.

15. Wheeled apparatus (10) as claimed in claim 12 in which said means for selectively positioning said seat back toward and away from said push handle (90A or 90B) further comprises means for pivotally positioning said seat-attaching bracket (110 or 166) around said operative attachment of said lower end (114 or 174) to said frame.

16. Wheeled apparatus (10) as claimed in claim 1 in which said operative attachment of said seat back (106) to said frame comprises a seat-attaching bracket (110) having a lower end (114) operatively attached to said frame, and having an upper end (111) operatively attached to said seat back;

said means for selectively positioning said seat back toward and away from said push handle (90A or 90B) comprises means for pivotally positioning said seat-attaching bracket around said operative attachment of said lower end thereof to said frame, means for rotationally positioning said seat back around said operative attachment thereof to said upper end of said seat-attaching bracket, and means for preventing said seat back from rotating backwardly and downwardly, with respect to said seat cushion (97), around said operative attachment of said seat back to said upper end of said seat-attaching bracket;

said bi-directional seating means (101) includes means, comprising said seat-attaching bracket, for allowing said seat back to be folded onto said seat cushion whether said seat back is positioned toward or away from said push handle; and said wheeled apparatus includes means, comprising said means for allowing said seat back to be folded onto said seat cushion, and comprising said foldable frame, for allowing said wheeled apparatus to be folded without removing said seat back.

17. Wheeled apparatus (10) as claimed in claim 1 in which said seat back (106) includes first (108A) and second (108B) surfaces;

said means for selectively positioning said seat back toward and away from said push handle (90A or 90B) comprises means for selectively using different ones of said surfaces as a backrest;

said apparatus comprises means for folding said seat back down toward said seat cushion (97); and said apparatus includes means, comprising said means for folding said seat back down toward said seat cushion, for folding said frame without removing either said seat cushion or said seat back.

18. Wheeled apparatus (10) as claimed in claim 1 in which said wheeled apparatus comprises a basket (122) being disposed at least partially behind said seat back (106, 126, 148, or 164), and being operatively attached to said frame (12 or 258).

19. Wheeled apparatus (10) as claimed in claim 1 in which said wheeled apparatus comprises a fourth wheel (24B) being transversely spaced from said third wheel (24A) and being operatively attached to said frame (12 or 258);

said frame comprises left (14A or 260A) and right (14B or 160B) side frame members each having an end portion (198A or 198B) that curves outwardly;

said operative attachments of said third and fourth wheels to said frame comprise means for castoring said third and fourth wheels to respective ones of said outwardly-curved end portions;

said wheeled apparatus comprises left (188A) and right (188B) footrest-attaching arms being pivotally attached to respective ones of said frame members; and said wheeled apparatus further comprises support means, comprising said respective ones of said outwardly-curved end portions, for supporting said arms when said arms are pivoted downwardly.

20. Wheeled apparatus (10) as claimed in claim 1 in which said frame comprises left (14A or 260A) and right (14B or 260B) side frame members; and said wheeled apparatus comprises foot-leg rest means, comprising left (188A) and right (188B) attaching arms having first ends (189A and 189B) pivotally attached to respective ones of said frame members, and comprising a web (201) with separate ends (204A and 204B) of said web operatively attached to second ends (202A and 202B) of said arms, for providing a foot-leg rest (200) that extends between said arms.

21. Wheeled apparatus (10) as claimed in claim 1 in which said first (16A) and second (16B) wheels are negatively cambered with tops (66) thereof spaced apart by a first distance (64), and with bottoms (61) thereof spaced apart by a second and greater distance (62);

said wheeled apparatus comprises a fourth wheel (24B) being transversely spaced from said third wheel (24A) and being operatively attached to said frame (12 or 258); and said operative attachments of said third and fourth wheels comprise means for castoring said third and fourth wheels to said frame with said third and fourth wheels spaced apart by said second distance.

22. Wheeled apparatus (10) as claimed in claim 1 in which said wheeled apparatus includes a second push handle (90B or 90A); and said apparatus further comprises means for actuating brakes (276) on both of said first (16A) and second (16B) wheels without removing either hand (80) from said push handles.

23. Wheeled apparatus (10) as claimed in claim 1 in which said third wheel (24A) is smaller than said first (16A) and second (16B) wheels; and said third wheel precedes said first and second wheels when said wheeled apparatus is used as said wheeled walker.

24. Wheeled apparatus (10) as claimed in claim 1 in which said third wheel (24A) is smaller than said first (16A) and second (16B) wheels;

said third wheel precedes said first and second wheels when said wheeled apparatus is used as said wheeled walker; and said third wheel precedes said first and second wheels when said wheeled apparatus is used as said wheelchair.

25. Apparatus (10) as claimed in claim 1 in which said seat cushion (97) includes first (100A) and second (100B) sides, said back (106, 126, 148, 164) includes first (105A) and second (105B) sides, and said apparatus further comprises:

means for folding said seat back down toward said seat cushion;

means for pivoting one of said sides of said seat cushion upwardly; and means for pivoting one of said sides of said seat back upwardly.

26. Wheeled apparatus (10) as claimed in claim 1 in which said operative attachment of said seat back (126 or 148) to said frame (12 or 258) comprises a seat-attaching bracket (130 or 150); and said means for selectively positioning said seat back toward or away from said push handle (90A or 90B) comprises means (142A or 142B) for selectively attaching said seat-attaching bracket to said frame with said seat-attaching bracket selectively rotated around a vertical axis (144) to face in either of two directions (84 or 88).

27. Wheeled apparatus (10) as claimed in claim 1 in which said operative attachment of said seat back (164) to said frame (12 or 258) comprises a seat-attaching bracket (166) having a lower end (174) that is operatively attached to said frame, and having an upper end (170) that is operatively attached to said seat back;

said means for selectively positioning said seat back toward or away from said push handle (90A or 90B) comprises means (142A or 142B) for selective longitudinal positioning of said lower end of said seat-attaching bracket; and said means for selectively positioning said seat back toward or away from said push handle (90A or 90B) comprises means (136A or 136B) for rotationally positioning said seat back around said operative attachment thereof to said seat-attaching bracket.

28. Wheeled apparatus (10) which comprises a foldable frame (12 or 258), a seat cushion (97) being operatively attached to said frame, first (16A) and second (16B) transversely spaced-apart wheels being operatively attached to said frame, said frame having an open position (47) wherein said first and second wheels are spaced a maximum distance (62) apart, and having a folded position (121) wherein said first and second wheels are moved toward each other, the improvement which is characterized by:

bi-directional seating means (101, 124, 146, or 162), comprising said seat cushion, for sitting on said seat cushion facing either toward a front (76) or toward a rear (86) of said wheeled apparatus;

a seat back (106, 126, 148, or 164) being operatively attached to said frame; and means for selectively positioning said seat back for sitting while facing either toward said front or toward said rear of said wheeled apparatus.

29. Wheeled apparatus (10) as claimed in claim 28 in which said first (16A) and second (16B) wheels are cambered when said frame (12 or 258) is in said open position (47); and said wheeled apparatus comprises means for automatically changing a camber angle (60).

30. Wheeled apparatus (10) as claimed in claim 28 in which said wheeled apparatus comprises a third wheel (24A) being longitudinally spaced from said first (16A) and second (16B) wheels and being operatively attached to said frame (12 or 258);

said operative attachment of said first and second wheels to said frame comprises first (22A) and second (22B) axles;

said wheeled apparatus includes means, comprising a handgrip (82A or 82B) that is operatively attached to said frame, for pushing said wheeled apparatus; and said wheeled apparatus includes means, comprising said handgrip being disposed at a predetermined longitudinal location (95) with respect to said axles, for preventing said wheeled apparatus from overturning backwardly when using said wheeled apparatus as a wheeled walker.

31. Wheeled apparatus (10) as claimed in claim 23 in which said frame (12 or 258) comprises:

left (14A or 260A) and right (14B or 260B) side frame members; first and second top links (30A and 40A) being pivotally interconnected and each being pivotally attached to a respective one (14A or 260A, or 14B or 260B) of said frame members;

first and second struts (56, and 214 or 268) being pivotally interconnected, and each being pivotally attached to said respective ones of said side frame members;

means, comprising an operative connection between said links and said struts, for moving said pivotal interconnection of said struts as a predetermined function of pivotal movement of said links; and said operative connection between said links and said struts comprises a rigid connection to one (214 or 268) of said struts and a pivotal connection (E) to one (30A) of said links.

32. Wheeled apparatus (10) as claimed in claim 31 in which said operative connection between said links (30A and 40A) and said struts (56 and 214) comprises a pivotal connection (E) to one (30A) of said links being disposed substantially along a straight line (222) that intersects said pivotal interconnection of one (214) of said struts to the other (56) of said struts and said pivotal attachment of said one strut to said respective one (14A) of said side frame members.

33. Wheeled apparatus (10) as claimed in claim 31 in which said operative connection between said links (30A and 40A) and said struts (56 and 268) comprises a pivotal connection (E) to one (30A) of said links being displaced toward said pivotal attachment of said one link to said respective one (260B) of said side frame members (260A and 260B) from a straight line (272) that intersects said pivotal interconnection of one (268) of said struts to the other (56) of said struts and said pivotal attachment of said one strut to said respective one (260A) of said side frame members.

34. Wheeled apparatus (10) as claimed in claim 28 in which said wheeled apparatus includes:

means, comprising a handgrip (82A or 82B) that is operatively attached to said frame (12 or 258), for pushing said wheeled apparatus; and means, comprising means for rotating said handgrip with respect to said frame, for using said handgrip as an armrest.

35. Wheeled apparatus (10) as claimed in claim 34 in which said operative attachment of said handgrip (82A or 82B) to said frame (12 or 258) comprises a telescopically adjustable handle (90A or 90B) with upper (93A or 93B) and lower (92A or 92B) parts, said handgrip being operatively attached to said upper part, and said lower part being operatively attached to said frame.

36. Apparatus (10) as claimed in claim 28 in which said seat cushion (97) includes first (100A) and second (100B) sides, said seat back (106, 126, 148, or 164) includes first (105A) and second (105B) sides, and said foldability of said foldable frame (12 or 258) comprises:

means for folding said seat back down toward said seat cushion;

means for pivoting one of said sides of said seat cushion upwardly; and means for pivoting one of said sides of said seat back upwardly.

37. Apparatus (10) as claimed in claim 28 in which said foldable frame (12 or 258) includes left (14A) and right (14B) side frame members, said operative attachment of said seat cushion (97) to said foldable frame comprises both pivotal attachment of a seat frame (28) to one of said side frame members and attachment of said seat cushion to said seat frame, said attachment of said seat back (106, 126, 148, or 164) comprises pivotal attachment of said seat back to said seat frame, said seat cushion includes first (100A) and second (100B) sides, said seat back includes first (105A) and second (105B) sides, and said foldability of said foldable frame comprises:

means, comprising said pivotal attachment of said seat back to said seat frame, for folding said seat back down toward said seat cushion; and means, comprising said pivotal attachment of said seat frame to said one side frame member, and comprising said attachments of said seat cushion and said seat back to said seat frame, for folding said seat frame, said seat cushion, and said seat back upwardly.

38. Wheeled apparatus (10) as claimed in claim 28 in which said wheeled apparatus comprises a basket (122) being operatively attached to said seat back (148).

39. Wheeled apparatus (10) as claimed in claim 28 in which said wheeled apparatus comprises:

a tray (118) being operatively attached to said seat back (106, 126, or 148); and means (152) for folding said seat back down toward said seat cushion (97).

40. Wheeled apparatus (10) as claimed in claim 28 in which said wheeled apparatus comprises:

a basket (122) having first (158) and second (160) sides, said first side being disposed transversely to a longitudinal axis (20) and being operatively attached to said seat back (148), and said second side being disposed transversely to said longitudinal axis and being spaced from said first side;

a tray (118) being operatively attached to said second side of said basket;

means (152) for folding said seat back down toward said seat cushion (97); and means for collapsing said basket whereby said second side is moved toward said first side.

41. Wheeled apparatus (10) which comprises a foldable frame (12 or 258) and first (16A) and second (16B) transversely spaced-apart wheels being operatively attached to said frame, said frame having an open position (47) wherein said first and second wheels are spaced a maximum distance (62) apart, and having a folded position (121) wherein said first and second wheels are moved toward each other, the improvement which is characterized by:

said operative attachment of said first (16A) and second (16B) wheels to said foldable frame (12 or 258) comprising first (22A) and second (22B) axles that are operatively attached to said frame, and said first and second wheels being rotatably assembled to respective ones of said axles;

means, comprising said axles being disposed at an angle (70) to each other when said frame is in said open position (47), for cambering said wheels at a negative camber angle (60); and means for reducing said negative camber angle by at least 50 percent when said foldable frame is in said folded position (121).

42. Wheeled apparatus (10) as claimed in claim 41 in which said frame (12 or 258) comprises:

left (14A or 260A) and right (14B or 260B) side frame members;

first and second top links (30A and 40A) being pivotally interconnected and each being pivotally attached to a respective one (14A or 260A, or 14B or 260B) of said frame members;

first and second struts (56, and 214 or 268) being pivotally interconnected, and each being pivotally attached to said respective ones of said side frame members;

means, comprising an operative connection between said links and said struts, for moving said pivotal interconnection of said struts as a predetermined function of pivotal movement of said links; and said frame (12 or 258) comprises resilient means (226) for allowing a length (AF) between two (A and E) of said pivotal attachments to resiliently change.

43. Wheeled apparatus (10) as claimed in claim 41 in which said foldable frame (12 or 258) comprises a side frame member (14B or 260B), a first strut (56) that is pivotally attached to said side frame member at a first pivot point (F), a top link (30A) that is pivotally attached to said side frame member at a second pivot point (A), a second strut (48 or 266) that is pivotally attached to said top link at a third pivot point (E) that is distal from said second pivot point, and a fourth pivot point (G) wherein said first and second struts are interconnected;

said first and second pivot points are spaced apart by a first length (AF), said second and third pivot points are spaced apart by a second length (AE), said third and fourth pivot points are spaced apart by a third length (EG), and said fourth and first pivot points are spaced apart by a fourth length (FG); and a sum of said first and second lengths is equal to a sum of said third and fourth lengths within 10 percent of the smaller of said sums.

44. Wheeled apparatus (10) as claimed in claim 43 in which said sum of said first (AF) and second (AE) lengths is greater than said sum of said third (EG) and fourth (FG) lengths.

45. Wheeled apparatus (10) as claimed in claim 43 in which said sum of said first (AF) and second (AE) lengths is smaller than said sum of said third (EG) and fourth (FG) lengths.

46. Wheeled apparatus (10) as claimed in claim 43 in which said sum of said first (AF) and second (AE) lengths is substantially equal to said sum of said third (EG) and fourth (FG) lengths.

47. Wheeled apparatus (10) as claimed in claim 43 in which said foldable frame (12 or 258) further comprises resilient means (226) for resiliently allowing one (AF) of said lengths to change.

48. Wheeled apparatus (10) as claimed in claim 43 in which said pivotal attachment of said strut (48 or 266) to said top link (30A) comprises resilient means (226) for resiliently allowing said first length (AF) to change.

49. Wheeled apparatus (10) which comprises a frame (12 or 258) having a longitudinal axis (20), first (16A) and second (16B) transversely spaced-apart wheels being operatively attached to said frame, a third wheel (24A) being longitudinally spaced from said first and second wheels and being operatively attached to said frame, and a seat cushion (97) and a seat back (106, 126, 148, 164) being operatively attached to said frame, the improvement which is characterized by:

means, comprising a push handle (90A or 90B), for using said apparatus as either a wheelchair or a wheeled walker;

bi-directional seating means (101, 124, 146, or 162) for selectively positioning said seat back toward said push handle when said apparatus is used as a wheelchair, and away from said push handle when said wheeled apparatus is used as a wheeled walker;

said seat back (106) includes first (108A) and second (108B) surfaces;

said means for selectively positioning said seat back toward and away from said push handle (90A or 90B) comprises means for selectively using different ones of said surfaces as a backrest; and said bi-directional seating means (101) further comprises means for folding said seat back down toward said seat cushion (97).

50. A seat assembly (275) which comprises a seat frame (28), a seat cushion (97) having a front (98) and a back (99) and being operatively attached to said seat frame, and a seat back (106, 126, or 148) being operatively attached to said seat frame, the improvement which is characterized by:

said operative attachment of said seat back to said seat frame comprising a link (109A) with an upper end (111) that is pivotally (113A) attached to said seat back and with a lower end (114) that is pivotally (104A) attached to said seat frame;

means, comprising both of said pivotal attachments, for selectively positioning said seat back proximal to either said front or said back of said seat cushion;

means, comprising one (113A) of said pivotal attachments, for permitting said seat back to be folded down toward said seat cushion; and means for preventing said seat back from pivoting backwardly while permitting said folding of said seat back down toward said seat cushion.

51. A seat assembly (275) as claimed in claim 50 in which said means for preventing said seat back (106) from pivoting backwardly comprises abutment of said seat back against said seat frame (28).

52. A seat assembly (275) as claimed in claim 50 in which said seat assembly includes means, comprising said link (109A) abutting said seat frame (28), for positioning said seat back (106) vertically.

53. A seat assembly (275) as claimed in claim 50 in which:

said means for preventing said seat back (106) from pivoting backwardly comprises abutment of said seat back against said seat frame (28); and said seat assembly includes means, comprising said link (109A) abutting said seat frame (28), for positioning said seat back (106) vertically.

* * * * *

UNITED STATES PATENT AND TRADEMARK OFFICE
CERTIFICATE OF CORRECTION

PATENT NO. : 5,605,345

DATED : February 25, 1997

INVENTOR(S) : Ronald L. Erfurth et al.

It is certified that error appears in the above-indentified patent and that said Letters Patent is hereby corrected as shown below:

In column 4, "use" should be --user-- in line 18. In column 5, --and-- should be inserted after "back" in line 57. In column 8, --and-- should be inserted before "showing" in line 36. In column 11, "1" should be --2-- in line 44. In column 15, "by" should be --be-- in line 12; and "and" should be --or-- in line 16. In column 17, "give" should be --given-- in line 3. In column 20, "designation" should be --designated-- in line 18. In Claim 19, "160B" should be --260B-- in line 38. In Claim 31, "23" should be --41-- in line 46.

Signed and Sealed this

Twenty-eighth Day of October, 1997

Attest:

Bruce Lehman

BRUCE LEHMAN

*Attesting Officer* — *Commissioner of Patents and Trademarks*